United States Patent
Okubo et al.

(10) Patent No.: US 7,427,151 B2
(45) Date of Patent: Sep. 23, 2008

(54) VEHICLE LIGHTING APPARATUS AND VEHICLE HEADLAMP APPARATUS INCLUDING THE SAME

(75) Inventors: Yasuhiro Okubo, Isehara (JP); Yasufumi Suzuki, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 181 days.

(21) Appl. No.: 11/294,339

(22) Filed: Dec. 6, 2005

(65) Prior Publication Data

US 2006/0133104 A1 Jun. 22, 2006

(30) Foreign Application Priority Data

Dec. 7, 2004 (JP) .............................. 2004-354366

(51) Int. Cl.
  *F21V 21/00* (2006.01)
  *B60Q 1/06* (2006.01)
(52) U.S. Cl. .......................... 362/545; 362/44; 362/525
(58) Field of Classification Search .................. 362/35, 362/250, 277, 285, 523, 525, 543, 545, 43, 362/44

See application file for complete search history.

(56) References Cited

U.S. PATENT DOCUMENTS 6,891,333 B2   5/2005   Tatsukawa et al.
7,004,603 B2 * 2/2006   Knight ........................ 362/250
7,204,628 B2 * 4/2007   Ishida ......................... 362/545
2004/0027834 A1  2/2004  Chigusa et al.
2004/0240217 A1 12/2004  Rice

FOREIGN PATENT DOCUMENTS

| | | |
|---|---|---|
| DE | 20 2004 010 950 U1 | 10/2004 |
| EP | 1 077 158 A1 | 2/2001 |
| EP | 1 388 461 A2 | 2/2004 |
| GB | 2 342 435 A | 4/2000 |
| JP | 2004-071409 A | 3/2004 |
| JP | 2004-095480 A | 3/2004 |
| WO | WO-01/01038 A1 | 1/2001 |
| WO | WO-01/59360 A1 | 8/2001 |

* cited by examiner

*Primary Examiner*—John A Ward
(74) *Attorney, Agent, or Firm*—Foley & Lardner LLP

(57) ABSTRACT

A vehicle lighting apparatus emits a spot light distribution pattern to be combined with a low-beam light distribution pattern emitted from a headlamp. The vehicle lighting apparatus includes a semiconductor light source formed with a rectangular light emitting element; and a lens that projects light from the rectangular light emitting element under an upper horizontal cutoff line of the low-beam light distribution pattern, as the spot light distribution pattern of a substantially rectangular shape.

10 Claims, 29 Drawing Sheets

VEHICLE LIGHTING APPARATUS AND VEHICLE HEADLAMP APPARATUS INCLUDING THE SAME

CROSS-REFERENCE TO RELATED APPLICATIONS

The present document incorporates by reference the entire contents of Japanese priority document, 2004-354366 filed in Japan on Dec. 7, 2004.

BACKGROUND OF THE INVENTION

1. Field of the Invention

The present invention relates to a vehicle lighting apparatus that includes a semiconductor light-emitting device such as a light emitting diode (LED) or an electroluminescence (EL, including organic EL) as a light source, and emits a spot light distribution pattern to be combined with a low-beam light distribution pattern emitted from a headlamp, and a vehicle headlamp apparatus that includes the vehicle lighting apparatus, separately emits and combines the low-beam light distribution pattern and the spot light distribution pattern.

2. Description of the Related Art

A conventional vehicle lighting apparatus and a conventional vehicle headlamp apparatus including the vehicle lighting apparatus (hereinafter, "vehicle headlamp system") are disclosed in, for example, Japanese Patent Application Laid-Open No. 2004-71409 and Japanese Patent Application Laid-Open No. 2004-95480. The apparatuses disclosed in the former literature are constituted of a convex-type light emitting element and a fan-type light emitting element, both including an LED as a light source. The convex-type light emitting element outwardly emits a spot-type light distribution. The fan-type light emitting element outwardly emits a wide light distribution. Combining these light distributions provides a low-beam light distribution including a cut line. The apparatuses disclosed in the latter literature also utilize the LED as the light source, and includes four types of lighting units. A first lighting unit outwardly emits a cutoff line forming pattern including a horizontal and an oblique cutoff line. A second lighting unit outwardly emits a generally semi-circular hot zone forming pattern having a linear upper edge along the horizontal cutoff line. A third lighting unit outwardly emits a generally semicircular hot zone forming pattern having a linear upper edge along the oblique cutoff line. A fourth lighting unit outwardly emits a diffusion region forming pattern. Combining these four patterns provides a predetermined low-beam light distribution pattern.

In a structure of the apparatuses disclosed in the former literature, however, the convex-type light emitting element is not provided with any other function but to simply outwardly emit only the spot-type light distribution, and the fan-type light emitting element simply outwardly emits only the wide light distribution, without any other function. Accordingly, in the former system the spot-type light distribution or the wide light distribution may surpass the low-beam cut line thus to create a glaring effect, however no remedy for such glaring effect is provided. On the other hand, the system disclosed in the latter literature utilizes a shade to cut off a portion of the light emitted by the LED, thus failing to fully utilize the entire light from the light source.

SUMMARY OF THE INVENTION

It is an object of the present invention to at least solve the problems in the conventional technology.

A vehicle lighting apparatus according to one aspect of the present invention emits a spot light distribution pattern to be combined with a low-beam light distribution pattern emitted from a headlamp. The vehicle lighting apparatus includes a semiconductor light source formed with a rectangular light emitting element; and a lens that projects light from the rectangular light emitting element under an upper horizontal cutoff line of the low-beam light distribution pattern, as the spot light distribution pattern of a substantially rectangular shape.

A vehicle headlamp apparatus according to another aspect of the present invention independently emits a low-beam light distribution pattern and a spot light distribution pattern. The vehicle headlamp apparatus includes a headlamp that emits the low-beam light distribution pattern; and at least one lighting apparatus that emits the spot light distribution pattern. The lighting apparatus includes a semiconductor light source formed with a rectangular light emitting element; and a lens that projects light from the rectangular light emitting element under an upper horizontal cutoff line of the low-beam light distribution pattern, as the spot light distribution pattern of a substantially rectangular shape. The low-beam light distribution pattern is combined with the spot light distribution pattern.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
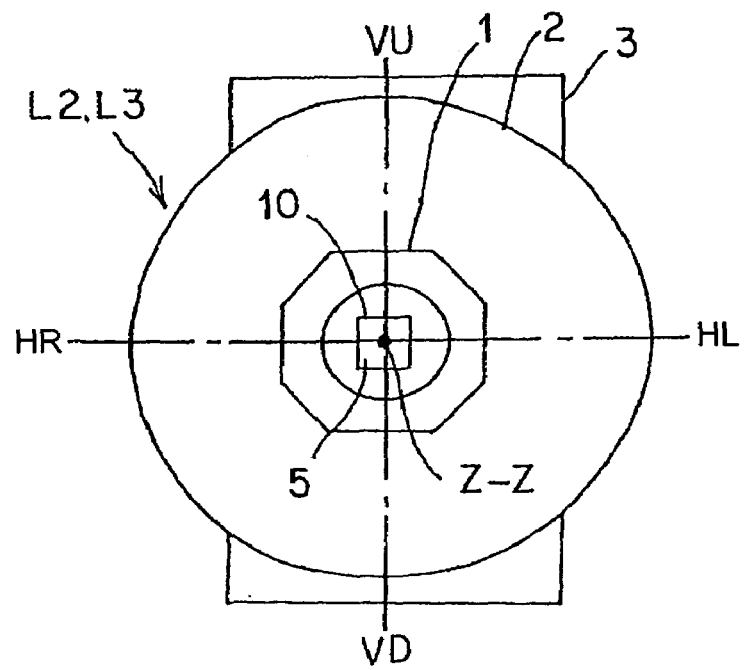
FIG. 1 is a front view showing a second or a third spot lamp unit of a vehicle headlamp system (vehicle lighting apparatus) according to an embodiment of the present invention.

Exemplary embodiments of the present invention will be described in detail below with reference to the accompanying drawings. It should be noted, however, that the present invention is not limited to the embodiments. The following description of the vehicle headlamp system is based on the assumption that the vehicle (C) is to drive on the left side. The structure and light distribution pattern of the vehicle headlamp system for right-side traffic is generally mirror-symmetric.

In the present specification and the drawings, F is a forward driving direction of the vehicle C, from the viewpoint of the driver. B is an opposite direction to the forward driving direction of the vehicle C, which is the rear side from the viewpoint of the driver. U is an upper side; D is a lower side; L is a left side of the vehicle with respect to the forward direction F; and R is a right side with respect to the forward direction F, all from the viewpoint of the driver.

HL-HR is a horizontal line in a left and right direction (left and right horizontal direction), or a left and right horizontal line on a screen placed 25 meters ahead, onto which the light distribution pattern is projected. VU-VD is a vertical line in an up and down direction (up and down vertical direction), or an up and down vertical line on a screen placed 25 meters ahead, onto which the light distribution pattern is projected. HF-HB is a horizontal line in a front and back direction (front and back horizontal direction). The terms upper, lower, left, and right used in the claims are respectively equivalent to upper or upper side, lower or lower side, left or left side, and right or right side used herein and in the drawings.

Figure 5:
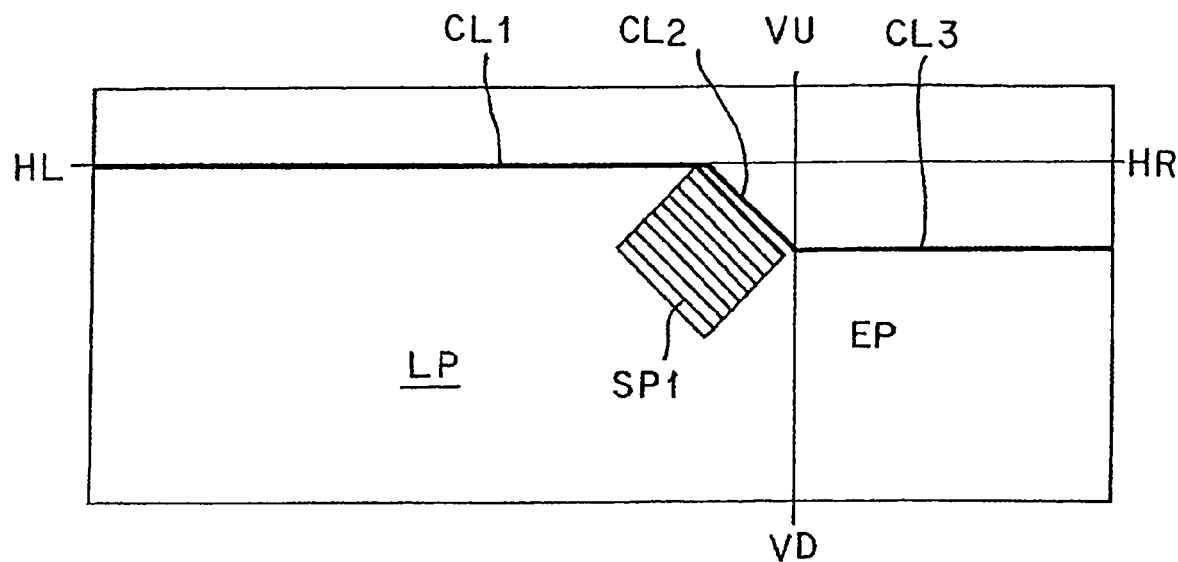
FIG. 5 is an explanatory drawing of a light distribution pattern obtained by the first spot lamp unit, shown on a screen.
Figure 6:
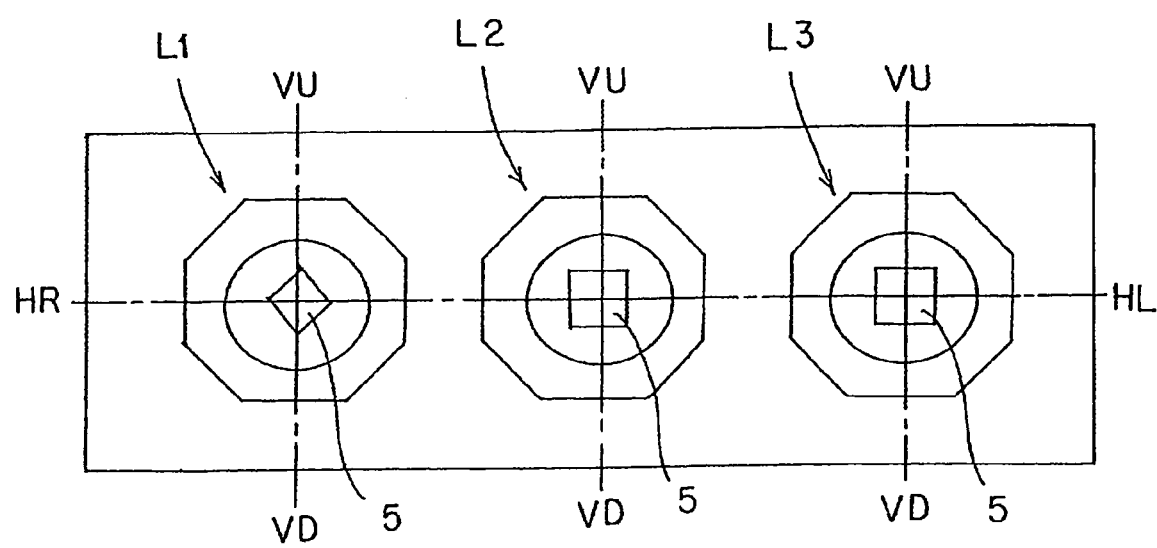
FIG. 6 is a front view of three spot lamp units in a combined state.
Figure 7:
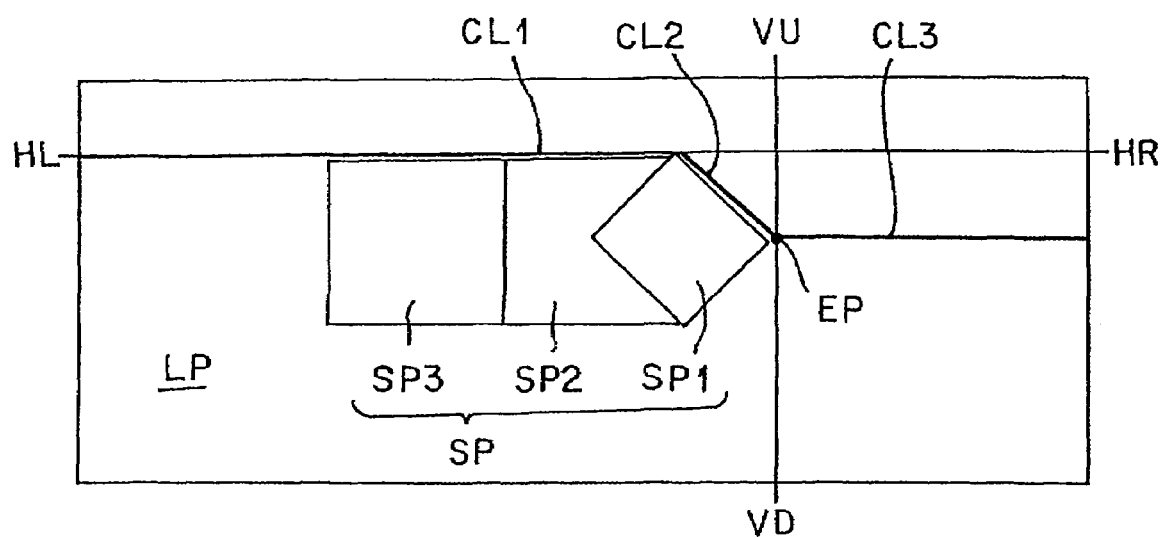
FIG. 7 is an explanatory drawing of a light distribution pattern obtained by the three spot lamp units, shown on a screen.
Figure 8:
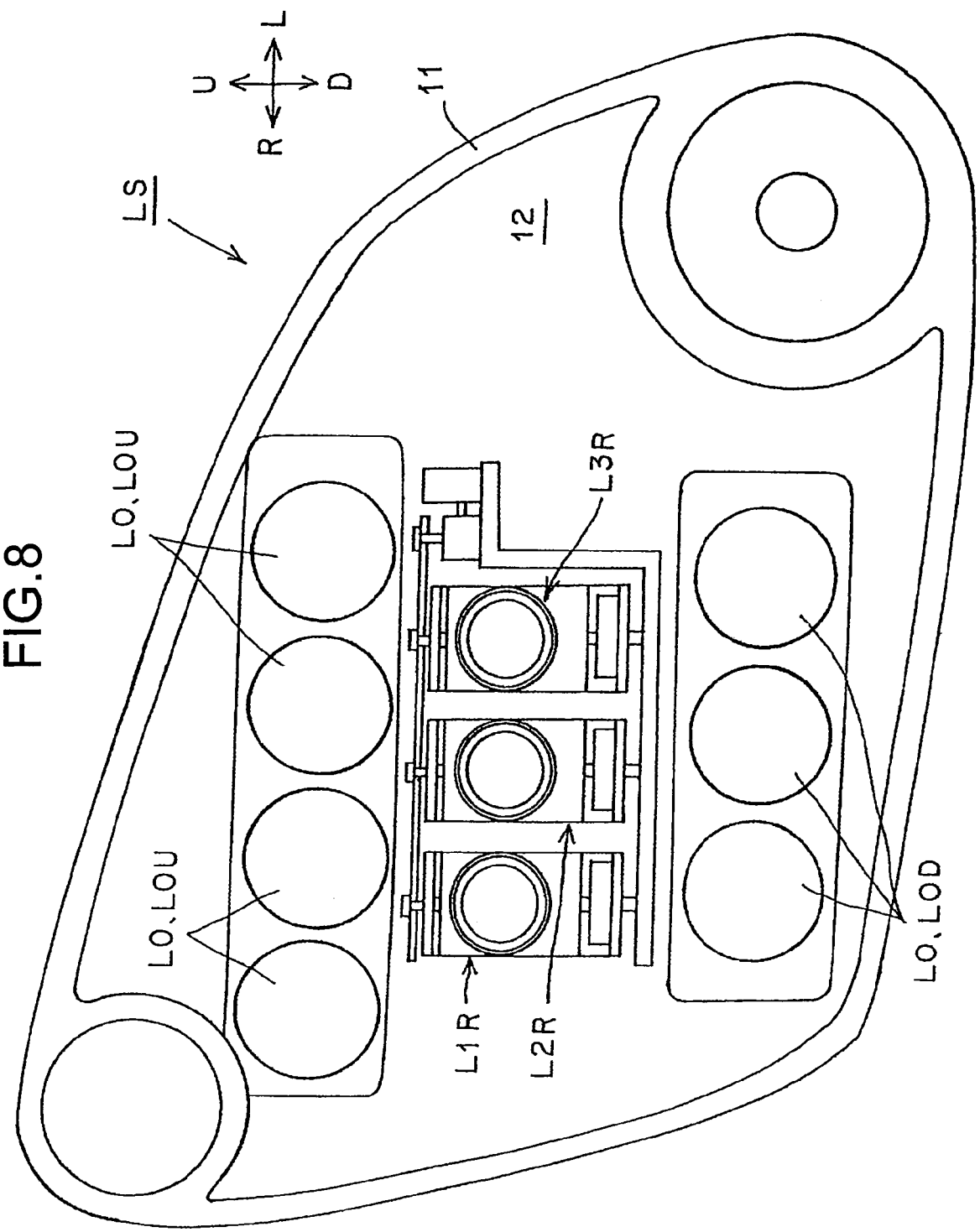
FIG. 8 is a front view showing the vehicle headlamp system (vehicle headlamp apparatus including the vehicle lighting apparatus) according to an embodiment of the present invention, with an outer lens removed.
Figure 9:
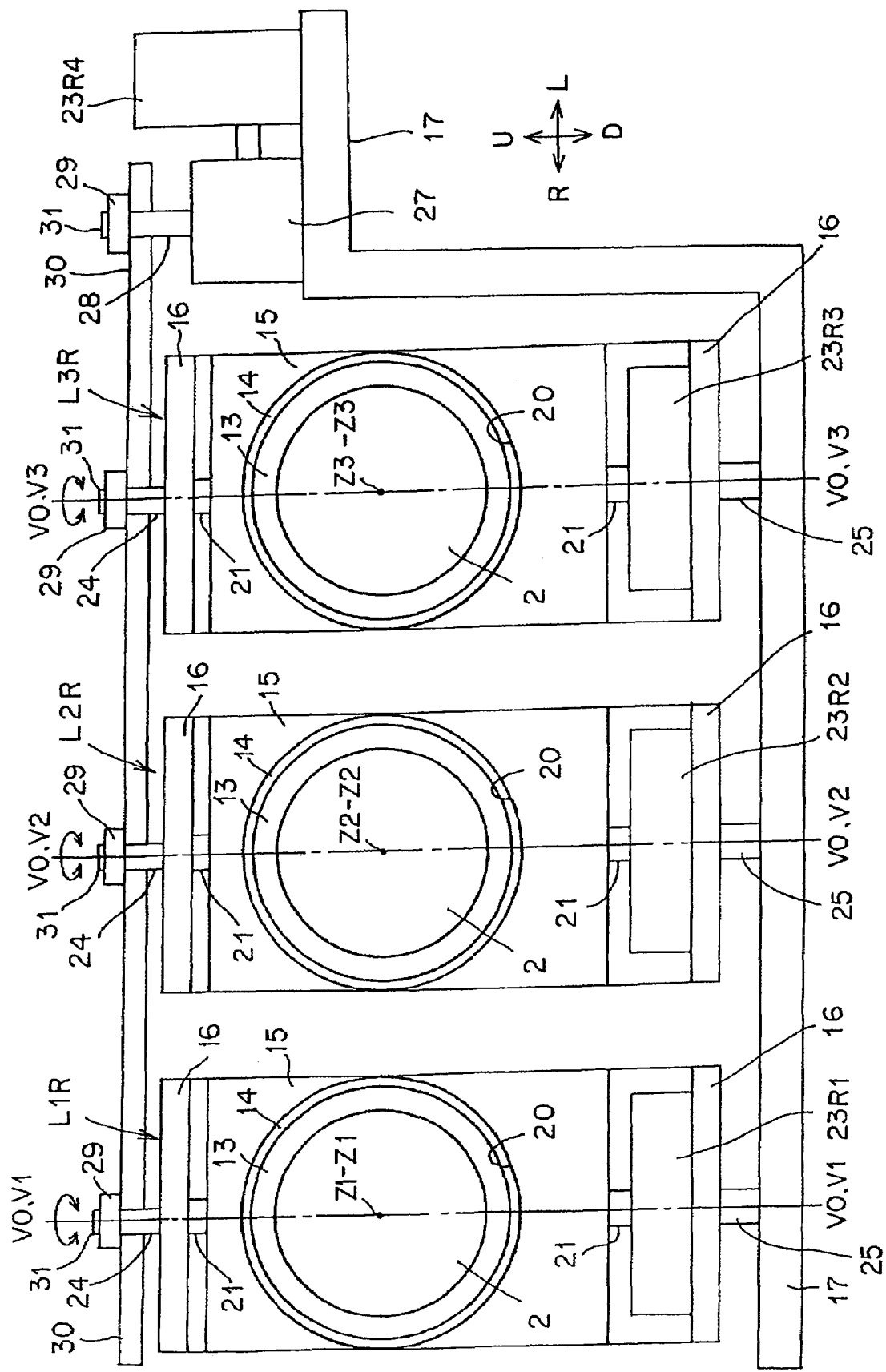
FIG. 9 is a front view of three variable spot lamp units on the right side.

FIGS. 1 to 7 depict the vehicle lighting apparatus of the vehicle headlamp system according to this embodiment, namely spot lamp units L1, L2, and L3. As shown in FIG. 7, the spot lamp units L1, L2, and L3 respectively emit a spot light distribution pattern SP (SP1, SP2, and SP3) to a predetermined position in a low-beam light distribution pattern LP, set as a basic light distribution pattern. The low-beam light distribution pattern LP emitted by the headlamp (refer to fixed headlamp units L0, L0U, and L0D shown in FIG. 8) and the spot light distribution patterns SP (SP1, SP2, and SP3) emitted by the spot lamp units L1, L2, and L3 are combined as shown in FIG. 7.

Figure 3:
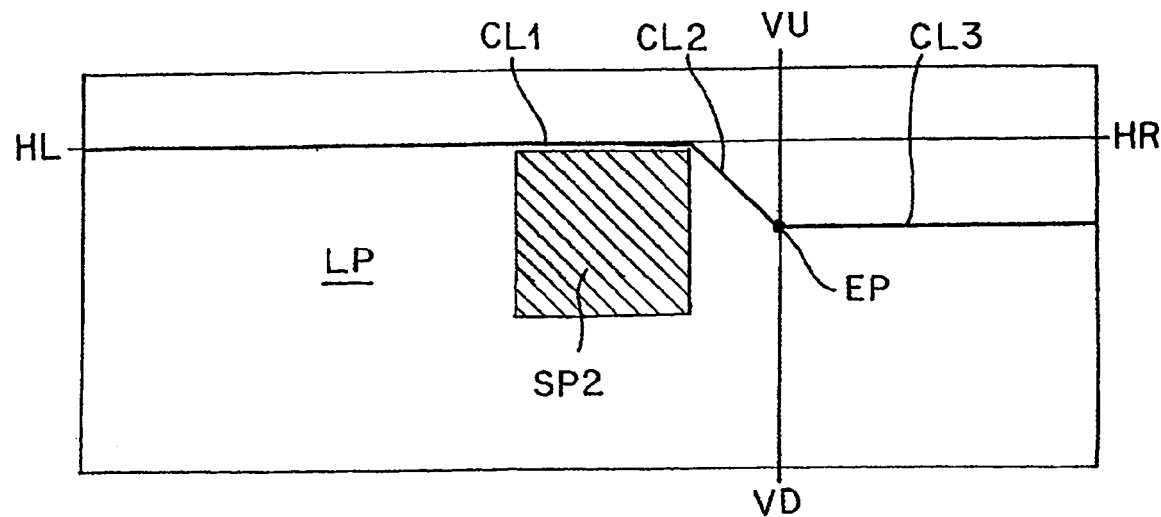
FIG. 3 is an explanatory drawing of a light distribution pattern obtained by the second spot lamp unit, shown on a screen.

The low-beam light distribution pattern LP includes an upper horizontal cutoff line CL1, an oblique cutoff line CL2, a lower horizontal cutoff line CL3 and an elbow point EP, as shown in FIGS. 3, 5, and 7. The upper horizontal cutoff line CL1 is at generally the same level as a left and right horizontal line HL-HR on a screen. The oblique cutoff line CL2 is located between the upper horizontal cutoff line CL1 and the lower horizontal cutoff line CL3. The lower horizontal cutoff line CL3 is below the left and right horizontal line HL-HR on the screen with an interval of approximately 0.57 degrees. The elbow point EP is the intersection of the up and down vertical line VU-VD, the oblique cutoff line CL2 and the lower horizontal cutoff line CL3. In the low-beam light distribution pattern LP, a left upper region along the oblique cutoff line CL2 from the elbow point EP serves to secure a long-distance visibility.

The spot lamp units L1, L2, and L3 respectively include a semiconductor light source 1, a lens 2, and a holder 3. The semiconductor light source 1 may be a self-emission semiconductor light source, such as an LED or an EL including an organic EL (an LED in this embodiment). The semiconductor light source 1 includes a substrate 4, a light emitting element 5 constituted of a light source chip (semiconductor chip) fixed on a surface of the substrate 4, a light transmitting unit 6 covering the light emitting element 5, and a heat dissipating unit 7 attached to the opposite surface of the substrate 4. The light emitting element 5 is basically of a minute square, i.e. a rectangular shape having four straight sides (in this embodiment, a diamond or square shape). One of the sides of the light emitting element 5 corresponds to the cutoff lines CL1 and CL2 of the low-beam light distribution pattern LP, as will be described later.

The lens 2 is a refractive lens having a focus F0. The lens 2 emits the light from the light emitting element 5 (solid line arrows in FIG. 2) as the spot light distribution patterns SP1, SP2, and SP3, in generally the same shape as that of the light emitting element 5. Accordingly, the projection from the lens 2 forms a rectangular image (the spot light distribution patterns SP1, SP2, and SP3), as shown in FIGS. 3, 5, and 7. It is to be noted that the image of the spot light distribution patterns SP1, SP2, and SP3, in other words the image of generally the same shape as the light emitting element 5 includes a diamond or rectangular shape extended to the left and right by an optical element (refer to spot light distribution patterns SP10, SP20, and SP30 shown in FIGS. 41 to 43). The examples of such an optical element include a lens chip employed as the light transmitting unit 6 of the semiconductor light source 1, and a prism element employed as an outer lens disposed so as to transmit the light from the semiconductor light source 1. The image of the spot light distribution patterns SP1, SP2, and SP3 extended to the left and right thus to be modified into a diamond or rectangular shape is optimal as the light distribution pattern of the vehicle C extending to left and right.

Figure 2:
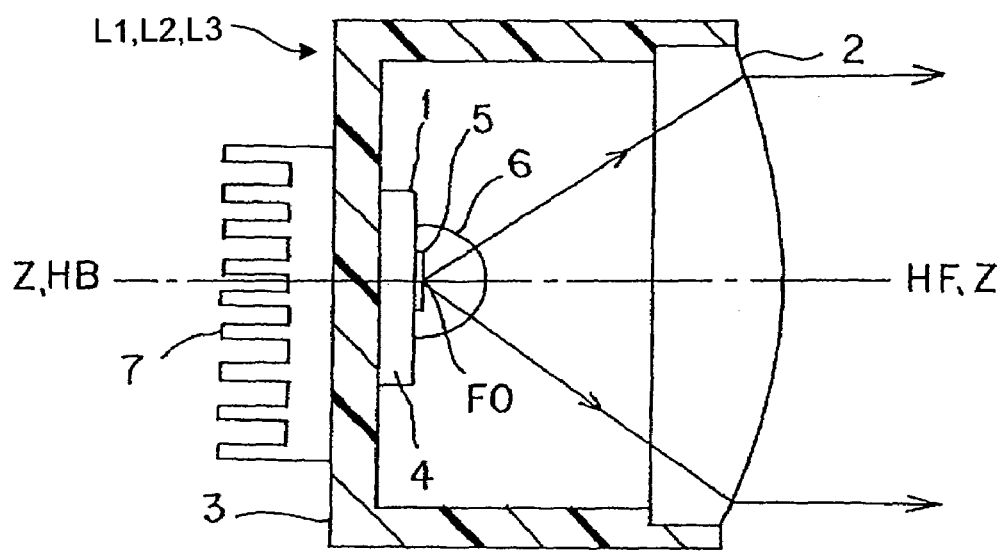
FIG. 2 is a cross-sectional view of the spot lamp unit.

The holder 3 retains the semiconductor light source 1 and the lens 2 in a predetermined relative positional relationship. In this embodiment, the semiconductor light source 1 and the lens 2 are retained in such a relative positional relationship that the focal point F0 of the lens 2 substantially falls on the light emitting element 5 of the semiconductor light source 1, as shown in FIG. 2. Therefore, the projection from the lens 2 forms a most condensed rectangular image, as shown in FIGS. 3, 5, and 7. Here, the light emitting element 5 of the semiconductor light source 1 and the focal point F0 of the lens 2 are movably mounted in a Z-Z direction along the optical axis of the spot lamp units L1, L2, and L3 (the center axis of the lens 2), so that the semiconductor light source 1 and the lens 2 are shifted, in the same relative positional relationship thereof, in the front and back horizontal direction HF-HB along the optical axis Z-Z. As a result, the condensed (reduced) rectangular image of the spot light distribution patterns SP1, SP2, and SP3 is turned into a diffused (enlarged) rectangular image.

Thus, the spot lamp units L1, L2, and L3 are constituted of a direct-emission optical system that directly distributes the light from the light emitting element 5 of the semiconductor light source 1 through the lens 2. The three spot lamp units L1, L2, and L3 are disposed in order from the right in the left and right horizontal direction, on the left and right horizontal line HL-HR, as shown in FIG. 6. Also, the three spot lamp units L1, L2, and L3 serve to emit the spot light distribution patterns SP1, SP2, and SP3 respectively, to predetermined positions in the low-beam light distribution pattern LP, as shown in FIG. 7.

More specifically, the first spot lamp unit L1 located at the right emits the first spot light distribution pattern SP1 to a region on the left of the oblique cutoff line CL2 and the elbow point EP of the low-beam light distribution pattern LP. The second spot lamp unit L2 located at the center emits the second spot light distribution pattern SP2 to a region on the left of the first spot light distribution pattern SP1. Likewise, the third spot lamp unit L3 located at the left emits the third spot light distribution pattern SP3 to a region on the left of the second spot light distribution pattern SP2.

Figure 4:
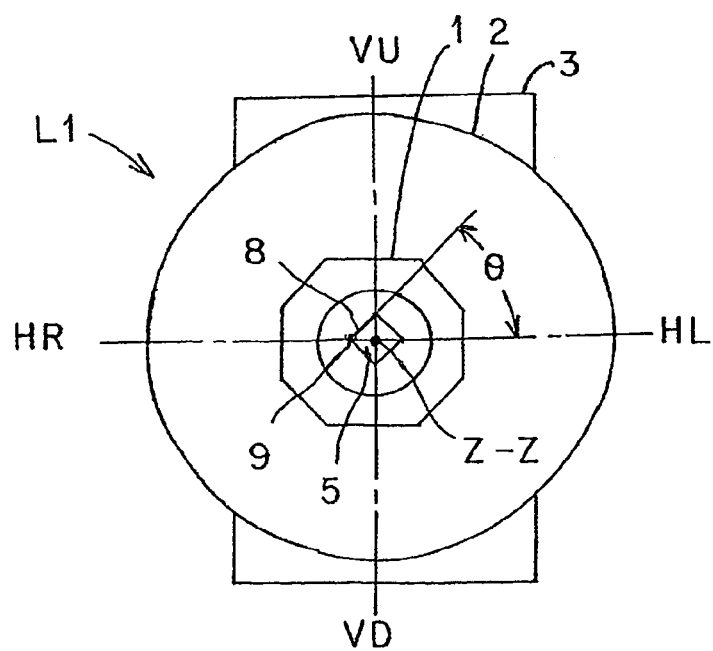
FIG. 4 is a front view of a first spot lamp unit.

In the first spot lamp unit L1, the semiconductor light source 1 is rotated (inclined) around the optical axis Z-Z (substantially coinciding with the center of the light emitting element 5) so that a side of the light emitting element 5 defines an angle θ (approximately 10 to 60 degrees) with respect to the left and right horizontal line HL-HR, as shown in FIG. 4 viewed from the front. Accordingly, as shown in FIGS. 5 and 7, the first spot lamp unit L1 is mounted such that a side of the rectangular first spot light distribution pattern SP1 (the upper right side of the diamond shape) corresponds to the oblique cutoff line CL2 of the low-beam light distribution pattern LP. Further, a side of the light emitting element 5 pattern SP1 (numeral 8 in FIG. 4) corresponds to the oblique cutoff line CL2 of the low-beam light distribution pattern LP, and one angle of the same (numeral 9 in FIG. 4) falls on the elbow point EP of the low-beam light distribution pattern LP.

In the second spot lamp unit L2 and the third spot lamp unit L3, the semiconductor light source 1 is rotated around the optical axis Z-Z so that a side of the light emitting element 5 becomes substantially parallel to the left and right horizontal line HL-HR, as shown in FIG. 1 viewed from the front. As a result, as shown in FIGS. 3 and 7, the second spot lamp unit L2 and the third spot lamp unit L3 are mounted such that a side of the rectangular second spot light distribution pattern SP2 and the rectangular third spot light distribution pattern SP3 (the upper horizontal side of the square) respectively correspond to the upper horizontal cutoff line CL1 of the low-beam light distribution pattern LP. Thus, a side of the light emitting element 5 (numeral 10 in FIG. 1) corresponds to the upper horizontal cutoff line CL1 of the low-beam light distribution pattern LP.

The spot lamp units L1, L2, and L3 employ the semiconductor light source 1 including the LED as the light source. The light emitting element 5 of the semiconductor light source 1, i.e. the light source chip (semiconductor chip) of the LED is basically of a rectangular shape of minute dimensions. Combining the semiconductor light source 1 with the lens 2 which is a refractive lens, and retaining them with the holder 3 with the light emitting element 5 of the semiconductor light source 1 located on the focal point F0 of the lens 2, leads to creation of a focused image (direct-emission image) i.e. a most condensed square image, from the light from the light emitting element 5. Emitting the most effectively condensed square image outward through the lens 2 as the spot light distribution patterns SP1, SP2, and SP3 easily provides a so-called "concentrated light distribution" which is suitable for securing a long-distance visibility, on the left of the oblique cutoff line CL2 and the elbow point EP of the low-beam light distribution pattern LP. Here, if the "concentrated light distribution" includes an oblique cutoff line and is projected closely on the left of the oblique cutoff line CL2 and the elbow point EP of the low-beam light distribution pattern LP, so as to serve to illuminate a rising portion from the elbow point EP in an upper left direction, the light distribution pattern should provide the most effective long-distance visibility. Accordingly, in the first spot lamp unit L1 according to this embodiment, the light emitting element 5 is rotated in advance by approximately 10 to 60 degrees with respect to the left and right horizontal line HL-HR when mounted in the optical system, so that a side of the focused (most condensed) square image from the light emitting element 5 corresponds to the "oblique cutoff line CL2" rising from the elbow point EP in an upper left direction. Such a configuration allows the first spot lamp unit L1 according to this embodiment to achieve an ideal low-beam light distribution pattern of LP and SP (refer to FIG. 20) that provides an excellent long-distance visibility, in combination with a lamp unit that emits the low-beam light distribution pattern LP.

The following passages cover the advantageous effect of the vehicle lighting apparatus of the vehicle headlamp system according to this embodiment, namely the spot lamp units L1, L2 and L3.

When the three spot lamp units L1, L2, and L3 are respectively turned on, the light from the light emitting element 5 of the semiconductor light source 1 in each of the spot lamp units L1, L2, and L3 is emitted outward through the lens 2 as the spot light distribution patterns SP1, SP2, and SP3, which are of the same shape as the square light emitting element 5, as shown in FIGS. 3, 5, and 7. Concurrently, the headlamp emits the low-beam light distribution pattern LP including the upper horizontal cutoff line CL1, the oblique cutoff line CL2, the lower horizontal cutoff line CL3, and the elbow point EP. The spot light distribution patterns SP (SP1, SP2, and SP3) emitted by the spot lamp units L1, L2, and L3 and the low-beam light distribution pattern LP emitted by the headlamp are combined.

Here, the light emitting element 5 has a straight side corresponding to the upper horizontal cutoff line CL1 and the oblique cutoff line CL2 of the low-beam light distribution pattern LP. Accordingly, the straight side of the light emitting element 5 can be aligned with the upper horizontal cutoff line CL1 and the oblique cutoff line CL2 of the low-beam light distribution pattern LP. Such a configuration prevents the spot light distribution patterns SP (SP1, SP2, and SP3) from surpassing the upper horizontal cutoff line CL1 and the oblique cutoff line CL2 of the low-beam light distribution pattern LP. Consequently, the spot lamp units L1, L2, and L3 can securely prevent the emergence of glare. Also, the spot lamp units L1, L2, and L3 utilize substantially an entirety of the light from the light emitting element 5 as it is, thereby effectively utilizing substantially the whole light supplied by the light emitting element 5, thus reducing power consumption to contribute to saving energy.

FIGS. 8 to 16 depict a vehicle headlamp apparatus LS included in the vehicle headlamp system according to this embodiment, i.e. the vehicle headlamp apparatus LS that includes the spot lamp units L1, L2, and L3 shown in FIGS. 1 to 7. The same numerals in FIGS. 8 to 16 as those in FIGS. 1 to 7 designate the same constituents. The vehicle headlamp apparatus LS is designed to be mounted on both the left side front and right side front of the vehicle C, respectively. The following description covers the vehicle headlamp apparatus LS to be mounted on the right side front. The vehicle headlamp apparatus LS to be mounted on the left side front has a generally the same structure as that of the right side headlamp unit LS. More specifically, the positions of a first, second, and third variable spot lamp units, which will be later described, are the same, while a fourth swivel unit is located at the mirror-symmetric position (left and right are reversed).

The vehicle headlamp apparatus LS includes a first variable spot lamp unit L1R, a second variable spot lamp unit L2R, and a third variable spot lamp unit L3R on the right side, having generally the same structure as that of the spot lamp units L1, L2, and L3 shown in FIGS. 1 to 7, and fixed headlamp units L0, L0U, and L0D serving as the headlamp. The headlamp units L0, L0U, and L0D and the variable spot lamp units L1R, L2R, and L3R are accommodated in a light chamber 12 partitioned by a lamp housing 11 and a lamp lens (not shown, for example, a transparent outer lens).

The fixed headlamp unit L0 includes an upper fixed headlamp unit group L0U and a lower fixed headlamp unit group L0D located above and below the variable spot lamp units L1R, L2R, and L3R respectively. The upper fixed headlamp unit group L0U includes four headlamp units each constituted of a semiconductor light source such as an LED, and primarily serves to diffuse the low-beam light distribution pattern LP of a fixed pattern. The lower fixed headlamp unit group L0D includes three headlamp units, also constituted of a semiconductor light source such as an LED, and primarily serves to emit the cutoff lines CL1, CL2, and CL3 of the low-beam light distribution pattern LP.

Figure 14:
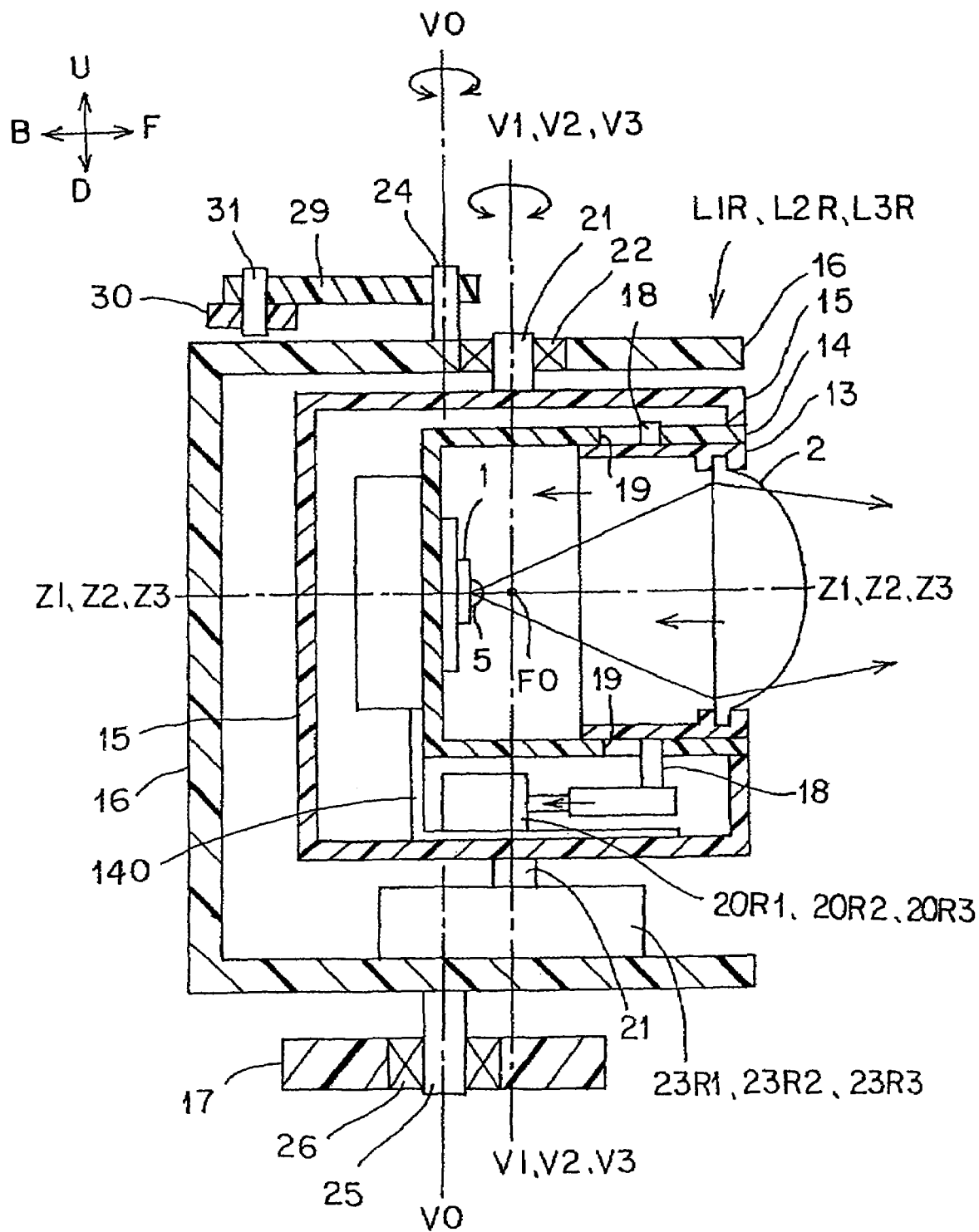
FIG. 14 is a vertical cross-sectional view of a variable spot lamp unit on the right side.
Figure 15:
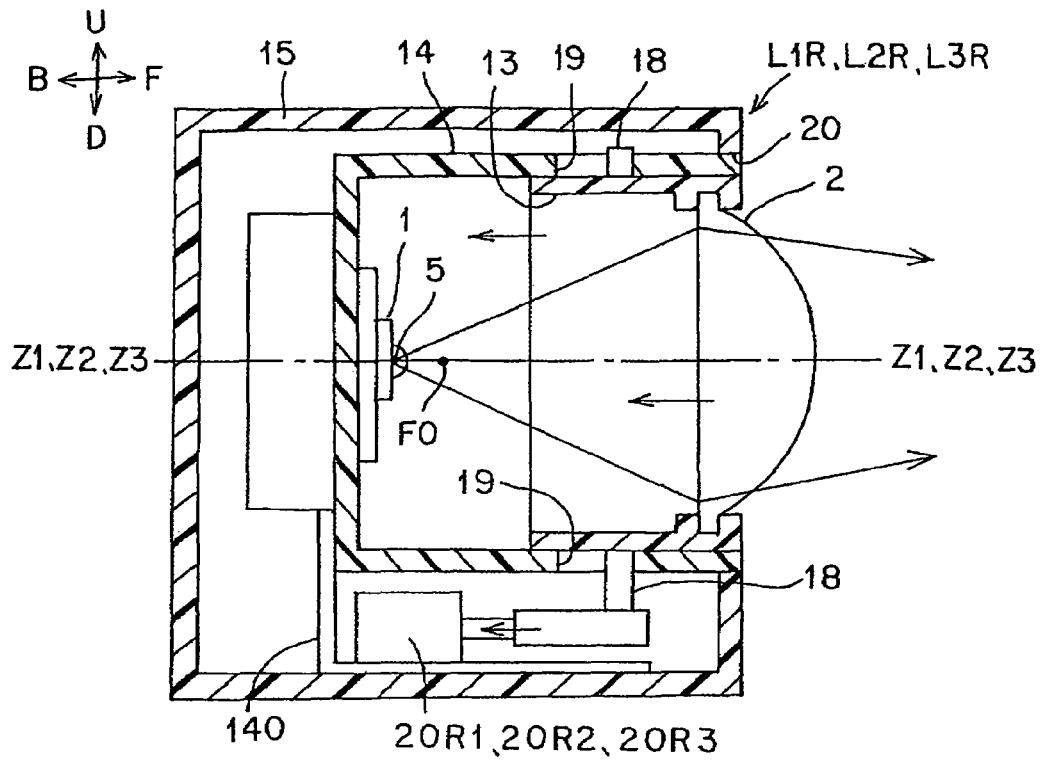
FIG. 15 is a vertical cross-sectional view of principal parts of the variable spot lamp unit on the right side, with the lens located at a first position.
Figure 16:
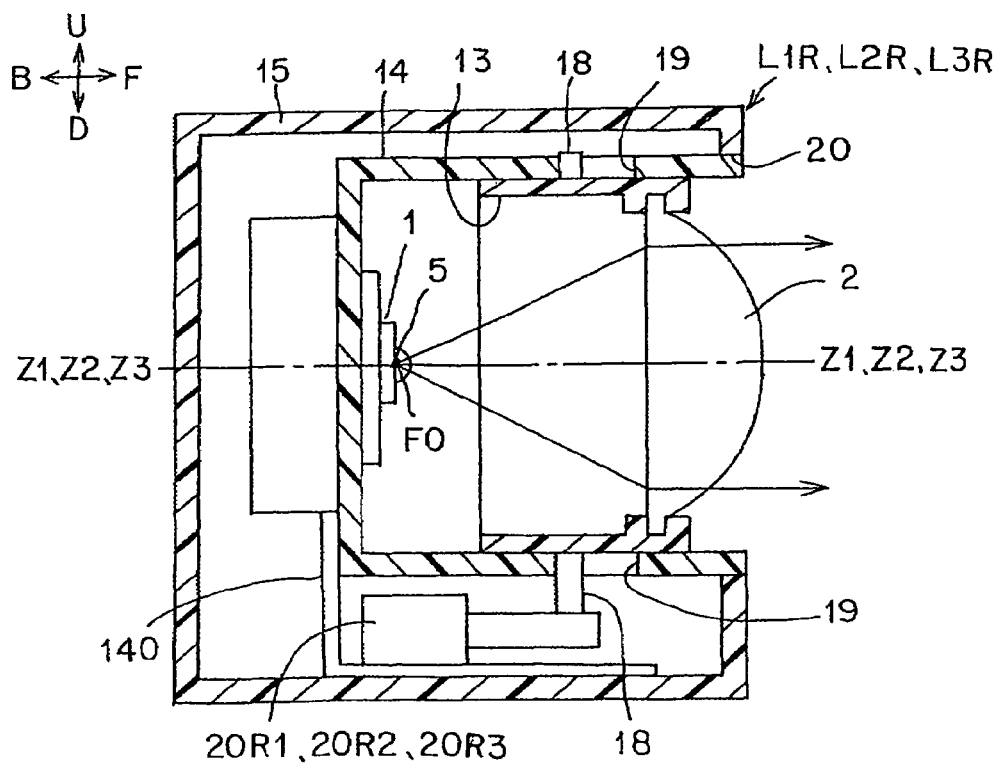
FIG. 16 is a vertical cross-sectional view of the principal parts of the variable spot lamp unit on the right side, with the lens located at a second position.

The variable spot lamp units L1R, L2R, and L3R respectively include, as shown in FIGS. 14 to 16, the semiconductor light source 1, the lens 2, and a holder group generally in a similar manner to the spot lamp units L1, L2, and L3 shown in FIGS. 1 to 7, so as to outwardly emit the spot light distribution patterns SP1, SP2, and SP3 which are variable patterns. The holder group includes a first holder 13, a second holder 14, a third holder 15, a fourth holder 16, and a fifth holder 17.

The first holder 13 is of a hollow cylindrical shape. The first holder 13 retains the lens 2 at the front end thereof. The second holder 14 is of a hollow cylindrical shape, with an opening only at the front end. The first holder 13 has an outer diameter that is the same or slightly smaller than an inner diameter of the second holder 14. At the rear closed end portion of the second holder 14 of each of the variable spot lamp units L1R, L2R, and L3R, the semiconductor light source 1 is attached as in the spot lamp units L1, L2, and L3 shown in FIGS. 1 to 7. Also, in the second holder 14, the first holder 13 is slidably accommodated along a direction of the optical axes Z1-Z1, Z2-Z2, and Z3-Z3 of the variable spot lamp units L1R, L2R, and L3R (the center axis of the lens 2), i.e. back and forth. The lens 2 is retained at the front end opening of the second holder 14, via the first holder 13.

The first holder 13 is provided with a guide pin 18, while the second holder 14 includes a guide groove 19 extending in the direction of the optical axes Z1-Z1, Z2-Z2, and Z3-Z3. The guide pin 18 of the first holder 13 is slidably engaged with the guide groove 19 of the second holder 14. Also, the first holder 13 and the second holder 14 are engaged with a first sliding unit 20R1, a second sliding unit 20R2, and a third sliding unit 20R3 on the right side serving as the condensing unit, in the variable spot lamp units L1R, L2R, and L3R respectively. Consequently, the first holder 13 is slidably mounted in the direction of the optical axes Z1-Z1, Z2-Z2, and Z3-Z3, with respect to the second holder 14.

The sliding units 20R1, 20R2, and 20R3 serving as the condensing unit may include, for example, a solenoid, a cylinder, and a stepping motor. The sliding units 20R1, 20R2, and 20R3 each cause the first holder 13 to slide between a front side first position (FIGS. 14 and 15) and a rear side second position (FIG. 16). At the first position, the lens 2 is protruding forward so that the focal point F0 of the lens 2 is ahead of the light emitting element 5 of the semiconductor light source 1. Under such a state, the spot light distribution patterns SP1, SP2, and SP3 are formed in a diffused (enlarged) rectangular shape. At the second position, the lens 2 is retracted backward so that the focal point F0 of the lens 2 falls on the light emitting element 5 of the semiconductor light source 1. The spot light distribution patterns SP1, SP2, and SP3 emitted under this state form a most effectively condensed (reduced) rectangular image.

The third holder 15 is of a hollow square cylindrical shape, and sufficiently large to accommodate the second holder 14 therein. The third holder 15 includes a circular through hole 20 at the front end portion. In the third holder 15, the first holder 13 and the second holder 14 are accommodated, such that the front end portion of the second holder 14 is fitted in the through hole 20. Also, the lower horizontal plate of the third holder 15 and the second holder 14 are combined via a mounting bracket 140. The fourth holder 16 is larger than the third holder 15 in vertical length, and has a channel-shaped vertical cross-section.

The third holder 15 is provided with rotating shafts 21 vertically mounted on the upper and lower horizontal plates respectively, i.e. along the direction of a vertical axes V1-V1, V2-V2, and V3-V3. The fourth holder 16 is provided with a bearing 22 on the upper horizontal plate. The rotating shaft 21 is rotatably supported by the bearing 22. Also, the lower rotating shaft 21 of the third holder 15 and the lower horizontal plate of the fourth holder 16 are engaged with a first swivel unit 23R1, a second swivel unit 23R2, and a third swivel unit 23R3 on the right side, which constitute a part of the swivel mechanism, in the variable spot lamp units L1R, L2R, and L3R respectively. Consequently, the first holder 13, the second holder 14 and the third holder 15 are accommodated in the fourth holder 16, rotatably around the substantially vertical axes V1-V1, V2-V2, and V3-V3.

Figure 13:
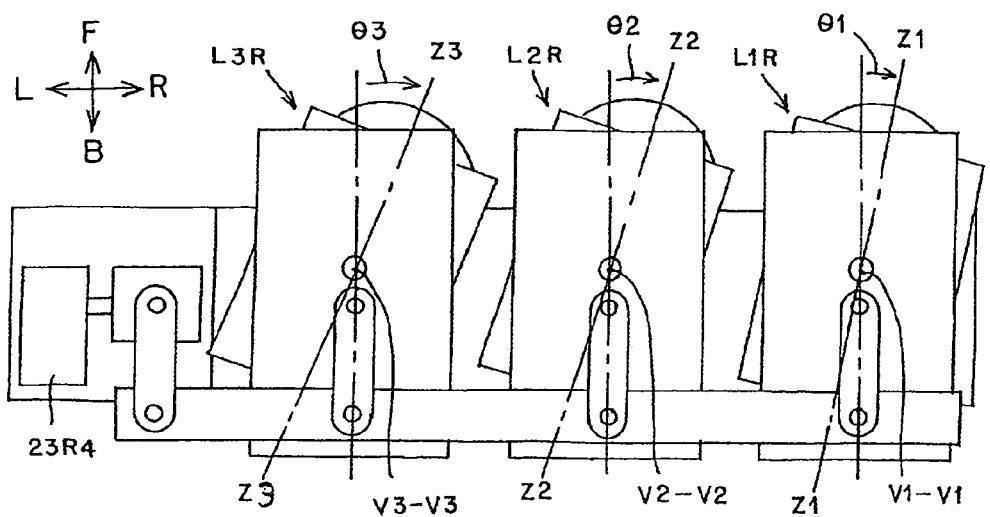
FIG. 13 is a plan view of three variable spot lamp units on the right side, each oriented to the right at different angles.

The first swivel unit 23R1, the second swivel unit 23R2, and the third swivel unit 23R3, which constitute a part of the swivel mechanism, include a stepping motor, a solenoid, a cylinder and so on. The first swivel unit 23R1, the second swivel unit 23R2, and the third swivel unit 23R3 allow the first holder 13, the second holder 14 and the third holder 15 to rotate around the substantially vertical axes V1-V1, V2-V2, and V3-V3 independently (at different angles) in the variable spot lamp units L1R, L2R, and L3R respectively. For example, as shown in FIG. 13, the first variable spot lamp unit L1R can be rotated clockwise around the substantially vertical axis V1-V1 by an angle θ1, the second variable spot lamp unit L2R clockwise around the substantially vertical axis V2-V2 by an angle θ2, and the third variable spot lamp unit L3R clockwise around the substantially vertical axis V3-V3 by an angle θ3, independently. Such a structure allows the optical axes Z1-Z1, Z2-Z2, and Z3-Z3 of the variable spot lamp units L1R, L2R, and L3R to independently rotate in a direction indicated by curved arrows in FIG. 10, thus enabling the spot light distribution patterns SP1, SP2, and SP3 to independently move (swivel) in a left and right direction. Here, the first holder 13, the second holder 14 and the third holder 15 may be set to rotate at a same angle in all the variable spot lamp units L1R, L2R, and L3R.

The fifth holder 17 includes an upper horizontal plate, a vertical plate and a lower horizontal plate. The lower horizontal plate of the fifth holder 17 has a sufficient length to locate the fourth holders 16 of the three variable spot lamp units L1R, L2R, and L3R side by side in the left and right direction. The fourth holder 16 is provided with a fixing shaft 24 and a rotating shaft 25 attached in a vertical direction, i.e. along the substantially vertical axis V0-V0, to the upper and lower horizontal plates respectively. The fifth holder 17 is provided with a bearing 26 on the lower horizontal plate. The rotating shaft 25 is rotatably supported by the bearing 26. Such a structure allows the first holder 13, the second holder 14, the third holder 15, and the fourth holder 16 of the variable spot lamp units L1R, L2R, and L3R to rotate around the substantially vertical axis V0-V0 with respect to the single fifth holder 17.

On the upper horizontal plate of the fourth cover 17, the fourth swivel unit 23R4 on the right side, which constitutes a part of the swivel mechanism, is installed. The fourth swivel unit 23R4 includes, for example, a stepping motor. The fourth swivel unit 23R4 is connected to a driving unit 27 via a driving force transmission mechanism, a reduction mechanism, and so on. The driving unit 27 includes a driving shaft 28. To the driving shaft 28 and the fixing shafts 24 of the three variable spot lamp units L1R, L2R, and L3R, four driving links 29 and a linkage bar 30 are respectively connected. The four driving links 29 are respectively connected to the linkage bar 30 via four connecting pins 31.

Figure 10:
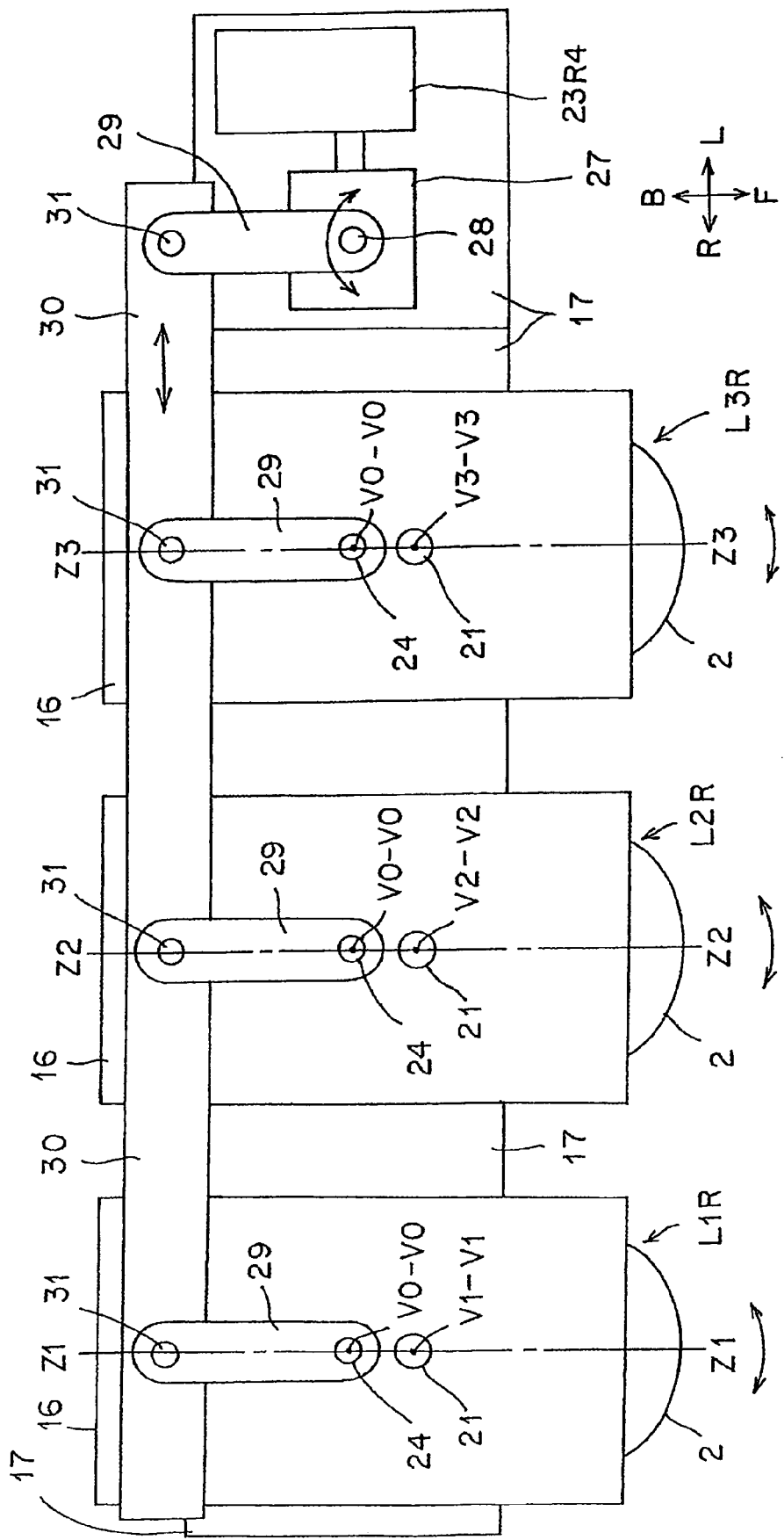
FIG. 10 is a plan view of three variable spot lamp units on the right side.
Figure 11:
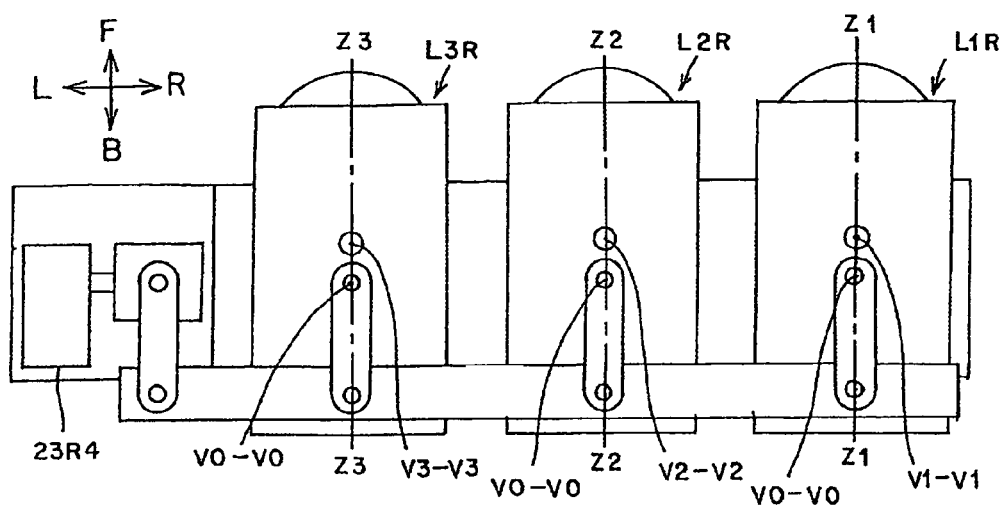
FIG. 11 is a plan view of three variable spot lamp units on the right side, each oriented to a front (forward) direction.
Figure 12:
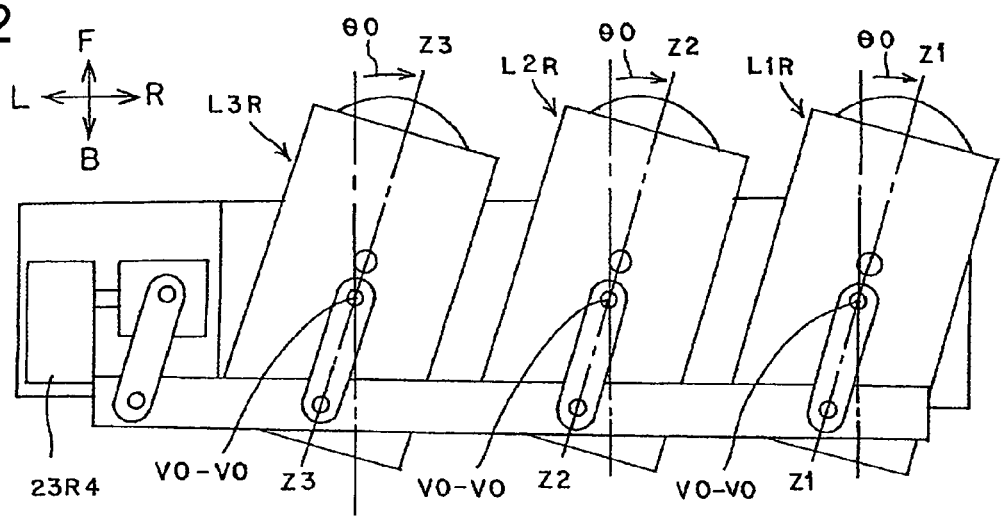
FIG. 12 is a plan view of three variable spot lamp units on the right side, each oriented to the right at the same angle.

When the fourth swivel unit 23R4 is activated so as to rotate the driving shaft 28 via the driving unit 27 in a direction indicated by a curved arrow in FIG. 10, the first holder 13, the second holder 14, the third holder 15, and the fourth holder 16 of the three variable spot lamp units L1R, L2R, and L3R are caused to simultaneously rotate around the substantially vertical axes V0-V0, via the four driving links 29, the linkage bar 30, the four connecting pins 31, and the three fixing shafts 24. For example, as shown in FIG. 12, the three variable spot lamp units L1R, L2R, and L3R can be caused to simultaneously rotate clockwise around the substantially vertical axis V0-V0 by the angle θ0. In this case, the optical axes Z1-Z1, Z2-Z2, and Z3-Z3 of the three variable spot lamp units L1R, L2R, and L3R are respectively caused to rotate simultaneously in a direction indicated by the curved arrows in FIG. 10. Thus, the spot light distribution pattern SP1, SP2, and SP3 are respectively caused to move (swivel) simultaneously in the left and right direction L-R.

Figure 17:
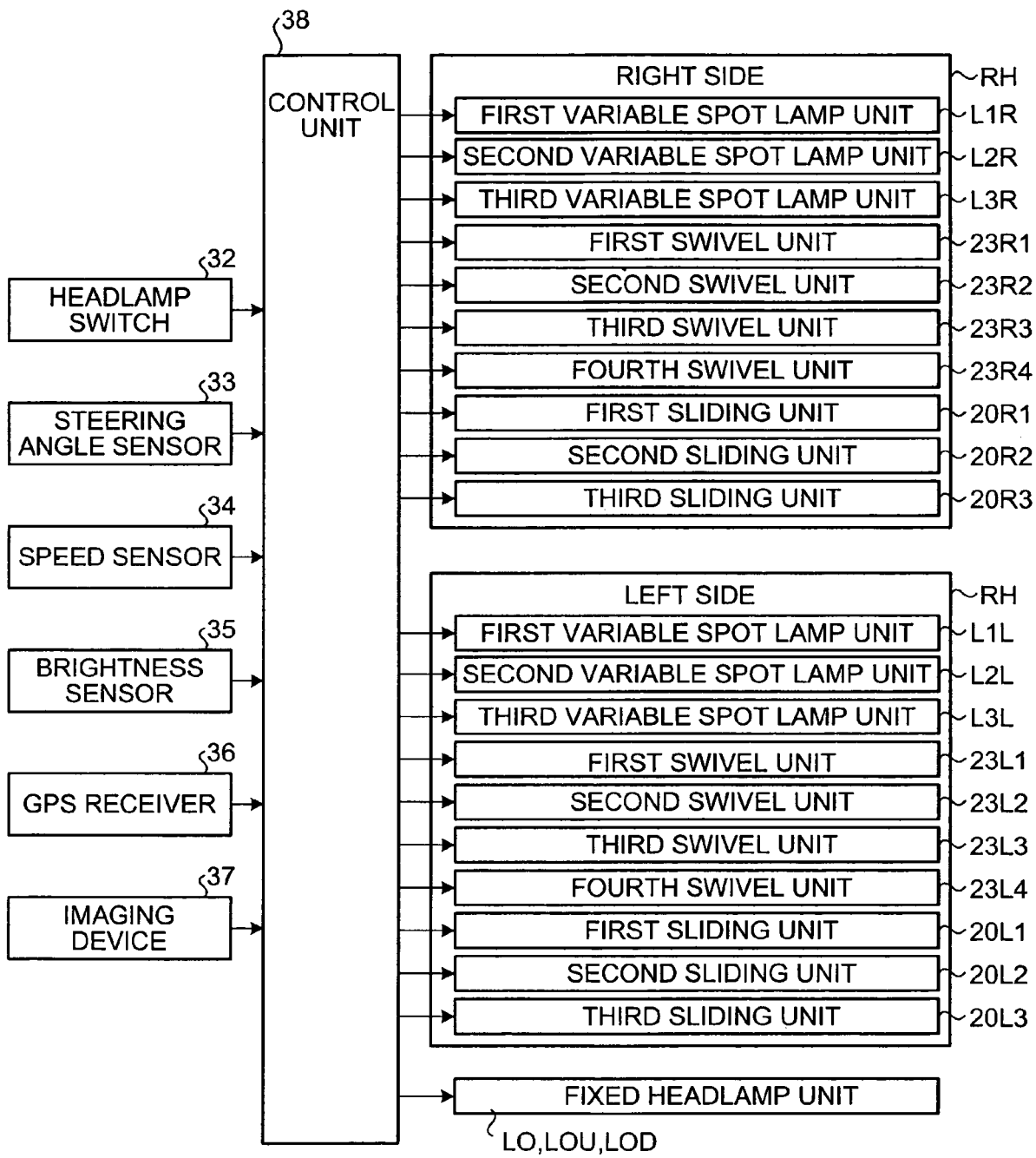
FIG. 17 is a block diagram showing a configuration of a vehicle headlamp system (vehicle headlamp apparatus including the vehicle lighting apparatus)

FIG. 17 is a block diagram showing a configuration of the vehicle headlamp apparatus LS of the vehicle headlamp system according to this embodiment. In FIG. 17, the same numerals designate the same constituents shown in FIGS. 1 to 16. As shown in FIG. 17, the vehicle headlamp apparatus LS includes the first variable spot lamp unit L1R, the second variable spot lamp unit L2R, the third variable spot lamp unit L3R, the first swivel unit 23R1, the second swivel unit 23R2, the third swivel unit 23R3, the fourth swivel unit 23R4, the first sliding unit 20R1, the second sliding unit 20R2, and the third sliding unit 20R3 on the right side RH, the first variable spot lamp unit L1L, the second variable spot lamp unit L2L, the third variable spot lamp unit L3L, the first swivel unit 23L1, the second swivel unit 23L2, the third swivel unit 23L3, the fourth swivel unit 23L4, the first sliding unit 20L1, the second sliding unit 20L2, and the third sliding unit 20L3 on the left side LH, the fixed headlamp units L0, L0U, and L0D, a headlamp switch 32, a steering angle sensor 33, a speed sensor 34, a brightness sensor 35, a global-positioning-system (GPS) receiver 36, an imaging device 37, and a control unit 38.

The structure of the variable spot lamp units L1R, L2R, and L3R, the swivel units 23R1, 23R2, 23R3, and 23R4, and the sliding units 20R1, 20R2, and 20R3 on the right side RH, the fixed headlamp units L0, L0U, and L0D, and the headlamp switch 32 is as shown in FIGS. 8 to 16. The structure of the variable spot lamp units L1L, L2L, and L3L, the swivel units 23L1, 23L2, 23L3, and 23L4, and the sliding units 20L1, 20L2, and 20L3 on the left side LH is generally the same as that of the variable spot lamp units L1R, L2R, and L3R, the swivel units 23R1, 23R2, 23R3, and 23R4, and the sliding units 20R1, 20R2, and 20R3 on the right side RH. More specifically, the positions of the first, the second, and the third variable spot lamp units are the same, while the fourth swivel unit is located at the mirror-symmetric position (left and right are reversed).

The headlamp switch 32, the steering angle sensor 33, the speed sensor 34, the brightness sensor 35, the GPS receiver 36, and the imaging device 37 constitute an environmental sensor unit that detects ambient conditions around the vehicle C to thereby output environmental detection signals.

The headlamp switch 32 serves to turn on or off the fixed headlamp units L0, L0U, and L0D activated by an on/off operation of the driver, and outputs an ON signal (for example, a high-level signal) when turned on and an OFF signal (for example, a low-level signal) when turned off, to the control unit 38.

The steering angle sensor 33 detects a steering angle, a steering direction, and an angular speed of the steering wheel, to thereby output a steering angle signal, a steering direction signal, and an angular speed signal to the control unit 38. More specifically, the steering angle sensor 33 detects the steering angle (rotation angle), the steering direction (rotating direction), and the angular speed (rotation speed) of the steering wheel operated by the driver when the vehicle C is running on a winding road (a road curved to the left or right) or turning to the left or right at an intersection, and then outputs the steering angle signal, the steering direction signal and the angular speed signal to the control unit 38. The steering angle signal and the steering direction signal are converted into specific numerical data via a network constituted of the steering angle sensor 33 and the control unit 38 incorporated in the vehicle C. The numerical data may be generated as +10 degrees when the steering wheel is rotated by 10 degrees to the right, and as −10 degrees when the steering wheel is rotated by 10 degrees to the left. The numerical data may also be generated as "990" when the steering wheel is rotated by 10 degrees to the right and "1010" when the steering wheel is rotated by 10 degrees to the left, with respect to a neutral value of 1000. Prior to this, the steering angle signal and the steering direction signal are obtained in a form of electric signals output to the control unit 38 by the steering angle sensor 33 (for example, an optical sensor) incorporated in the vehicle C.

The speed sensor 34 detects a speed of the vehicle C to thereby output a speed signal to the control unit 38. The brightness sensor 35 detects ambient brightness around the vehicle C, and outputs to the control unit 38 a HI (high-level) signal when the brightness is equal to or more than a predetermined value, and a LO (low-level) signal when the brightness is below the predetermined value. The GPS receiver 36 receives a positional information signal output by the GPS or an earth station (electronic reference point), and outputs the same to the control unit 38. The imaging device 37 may be, for example, a semiconductor imaging device such as a CCD camera or a CMOS camera, and shoots the environmental information around the vehicle C to thereby output an image signal generated by processing the shot image, to the control unit 38.

The control unit 38 may be constituted of a computer incorporated in the vehicle C, such as a computer in a car navigator (navigation system), or a computer in a control circuit unit or ECU (electronic control unit). The control unit 38 includes a dimming controller, a dimmer (for example, a current control device), a swivel controller, and a condenser controller. The dimming controller outputs a dimming control signal to the dimmer based on the environmental detection signal from the environmental sensor unit. The dimmer increases or decreases the output light flux of the light emitting element 5 so as to change the luminosity of the spot light distribution pattern SP (SP1, SP2, and SP3), based on the dimming control signal from the dimming controller. The swivel controller outputs a swivel control signal to the swivel units 23R1, 23R2, 23R3, 23R4, 23L1, 23L2, 23L3, and 23L4, based on the environmental detection signal from the environmental sensor unit. The condenser controller outputs a condenser control signal to the sliding units 20R1, 20R2, 20R3, 20L1, 20L2, and 20L3, based on the environmental detection signal from the environmental sensor unit.

FIGS. 18 to 24, 52, and 53 are explanatory graphs of iso-intensity curves showing simplified light distribution patterns on a screen generated by a computer simulation process. The innermost iso-intensity curve in the graph represents a highest-intensity zone, and the outermost curves represent the lower intensity zones. For example, the innermost iso-intensity curve in FIG. 53 delineates a zone of 50000 cd, and the outer curves respectively delineate zones of 20000 cd, 10000 cd, 5000 cd, 2000 cd, 1000 cd, and 300 cd. Also, the innermost iso-intensity curves in FIGS. 20 and 52 delineate zones of 20000 cd, and the outer curves respectively delineate zones of 10000 cd, 5000 cd, 2000 cd, 1000 cd, and 300 cd. Further, the innermost iso-intensity curve in FIG. 18 delineates a zone of 10000 cd, and the outer curves respectively delineate zones of 5000 cd, 2000 cd, 1000 cd, and 300 cd. Still further, the innermost iso-intensity curves in FIGS. 19, 21, 22, and 24 delineate zones of 20000 cd, and the outer curves respectively delineate zones of 10000 cd, 2000 cd, and 300 cd. Still further, the innermost iso-intensity curve in FIG. 23 delineates a zone of 10000 cd, and the outer curves respectively delineate zones of 2000 cd and 300 cd.

FIGS. 26, 28, 33, 35, 37, 39, 48, and 50 are explanatory graphs of iso-illuminance curves in a plan view, showing simplified light distribution patterns on a road generated by a computer simulation process. The iso-illuminance curve in an innermost region of the graph represents a high illuminance zone, and the outermost curves represent the lower illuminance zones. For example, the innermost iso-illuminance curve delineates a zone of 100 lx, and the outer curves respectively delineate zones of 70 lx, 50 lx, 30 lx, 20 lx, 10 lx, and 3 lx.

Figure 18:
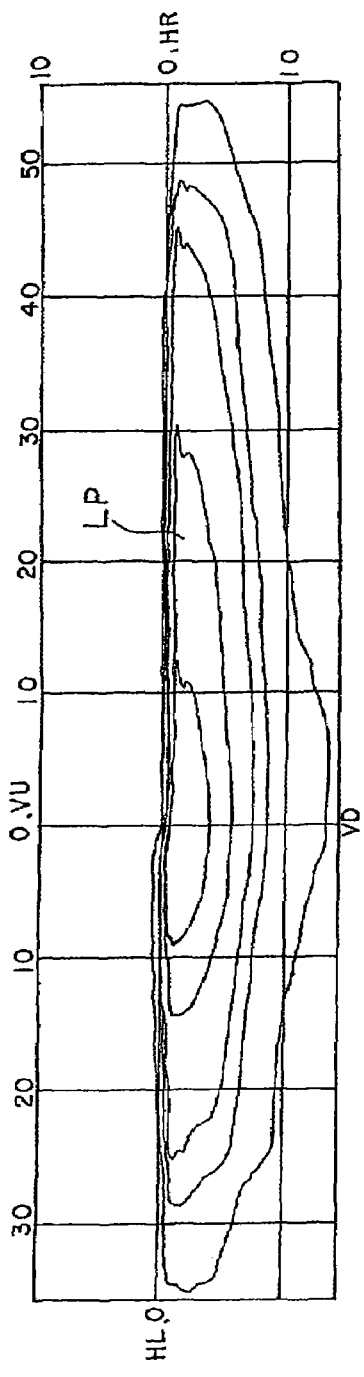
FIG. 18 is an explanatory drawing of a low-beam light distribution pattern based on a fixed light distribution obtained by a fixed headlamp unit, shown on a screen.

First, when the fixed headlamp units L0, L0U, and L0D are turned on, the low-beam light distribution pattern LP shown in FIG. 18, which is a fixed light distribution, is obtained. The low-beam light distribution pattern LP is a basic light distribution pattern including the cutoff lines CL1, CL2, and CL3 and the elbow point EP, as the low-beam light distribution pattern LP shown in FIGS. 3, 5, and 7. The low-beam light distribution pattern LP is in compliance with the corresponding low-beam light distribution standard, in its independent use. The low-beam light distribution pattern LP is in compliance with such light distribution standard, with 100 percent of the prescribed output light flux of the low-beam light distribution pattern LP (i.e. the prescribed output light flux of the fixed headlamp units L0, L0U, and L0D) set as the standard status. Here, the upper fixed headlamp unit group L0U is located above the variable spot lamp units L1R, L2R, and L3R. Accordingly, the diffused light distribution emitted by the upper fixed headlamp unit group L0U illuminates a closer road surface than the spot light distribution pattern SP emitted by the variable spot lamp units L1R, L2R, and L3R, and is hence optimal as the diffused light distribution of the low-beam light distribution pattern LP. Likewise, the lower fixed headlamp unit group L0D is located below the variable spot lamp units L1R, L2R, and L3R. Accordingly, the light distribution of the cutoff lines CL1, CL2, and CL3 emitted by the lower fixed headlamp unit L0D illuminates a road surface further ahead than the spot light distribution pattern SP emitted by the variable spot lamp units L1R, L2R, and L3R, and is hence optimal as the cutoff lines CL1, CL2, and CL3 of the low-beam light distribution pattern LP.

Figure 19:
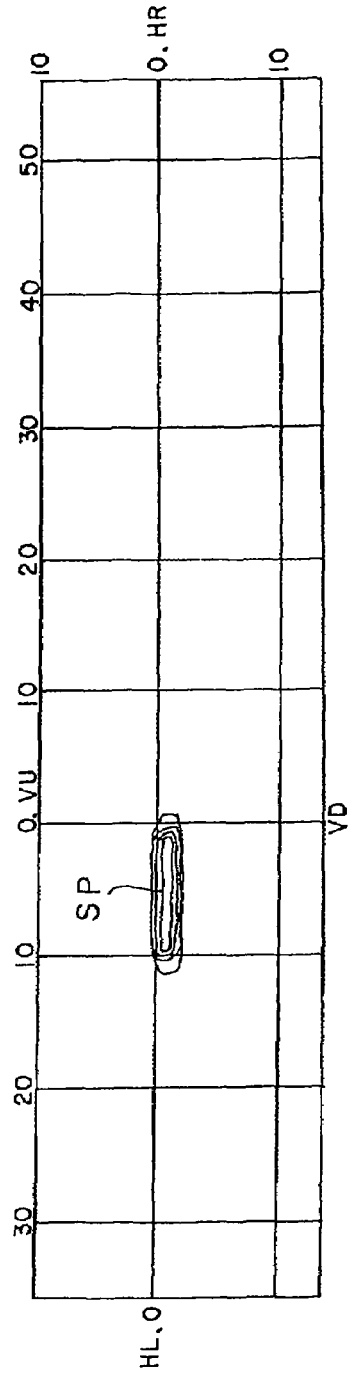
FIG. 19 is an explanatory drawing of a variable spot light distribution pattern based on a variable light distribution obtained by a variable spot lamp unit, shown on a screen.

When the variable spot lamp units L1R, L2R, L3R, L1L, L2L, and L3L are turned on, the spotlight distribution pattern SP shown in FIG. 19 is obtained, which is a variable light distribution. A main portion of the spot light distribution pattern SP (i.e. the innermost high-intensity zone and some peripheral zones) is generally strip-shaped or fan-shaped, to the left L from the elbow point EP and the oblique cut line CL2 of the low-beam light distribution pattern LP, and approximately 2 degrees below the left and right horizontal line HL-HR. The generally strip-shaped or fan-shaped spot light distribution pattern SP has a distribution characteristic of approximately 20000 cd or more, with 100 percent of the prescribed output light flux of the light emitting element 5 of the semiconductor light source 1 (LED) of the respective variable spot lamp units L1R, L2R, L3R, L1L, L2L, and L3L. Also, the total light flux of the spot light distribution pattern SP is approximately 100 lm or more. Here, the 100 percent of the prescribed output light flux of the spot light distribution pattern SP (i.e. the prescribed output light flux of the light emitting element 5 of the semiconductor light source 1 (LED) of the respective variable spot lamp units L1R, L2R, L3R, L1L, L2L, and L3L) is set as the standard status.

Figure 20:
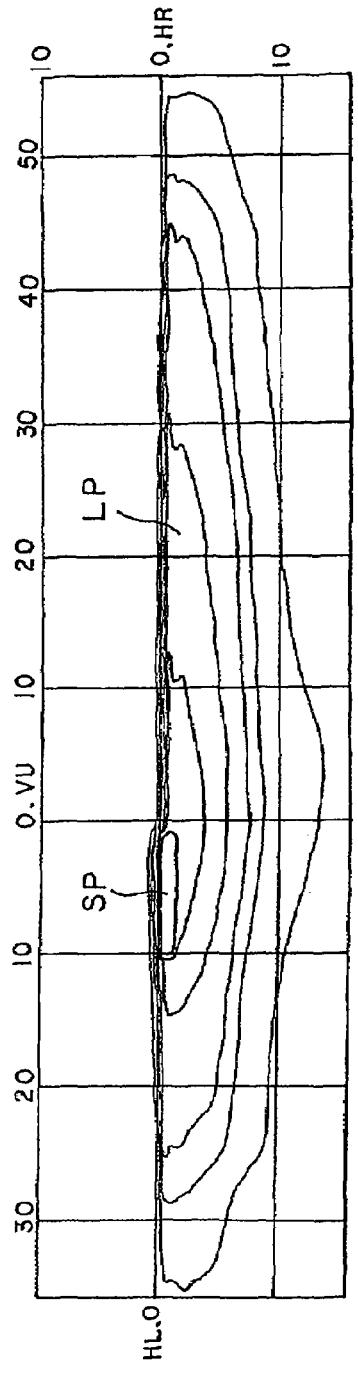
FIG. 20 is an explanatory drawing of an ideal low-beam light distribution pattern obtained by combining the low-beam light distribution pattern of FIG. 18 and the variable spot light distribution pattern of FIG. 19, shown on a screen.

Based on the above, when the fixed headlamp units L0, L0U, and L0D and the variable spot lamp units L1R, L2R, L3R, L1L, L2L, and L3L of the vehicle headlamp apparatus LS according to this embodiment are respectively turned on, the low-beam light distribution pattern LP shown in FIG. 18 which is a fixed light distribution and the spot light distribution pattern SP shown in FIG. 19 which is a variable light distribution are combined into a light distribution pattern shown in FIG. 20. This is an ideal low-beam light distribution pattern LP that provides excellent long-distance visibility because of the spot light distribution pattern SP.

Figure 21:
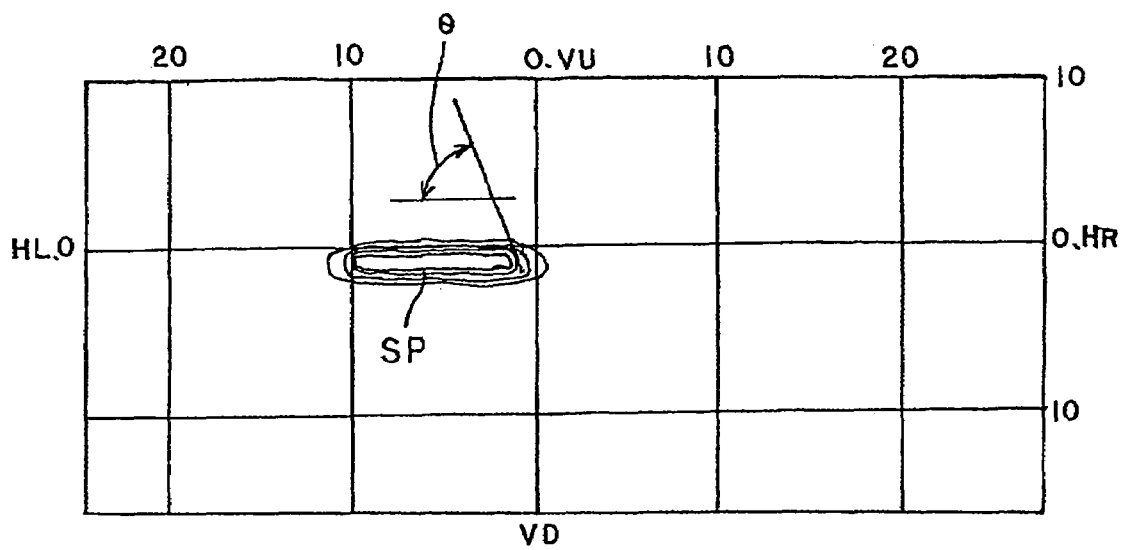
FIG. 21 is an explanatory drawing of details of the variable spot light distribution pattern shown on a screen.

Also, among the variable spot lamp units L1R, L2R, and L3R on the right side RH and the variable spot lamp units L1L, L2L, and L3L on the left side LH, the variable spot lamp unit L1R (L1L) serving to illuminate the right end portion of the spot light distribution pattern SP is disposed with the semiconductor light source 1 rotated around the optical axis Z-Z, such that a side of the light emitting element 5 makes an angle θ (approximately 10 to 60 degrees) with respect to the left and right horizontal line HL-HR, as shown in FIG. 4. As a result, the right end portion of the spot light distribution pattern SP is cut off at the angle θ (approximately 10 to 60 degrees) as shown in FIG. 21. Consequently, the spot light distribution pattern SP can again form the elbow point and the oblique cutoff line at a position horizontally shifted to the right R, i.e. a position determined upon swiveling.

Figure 22:
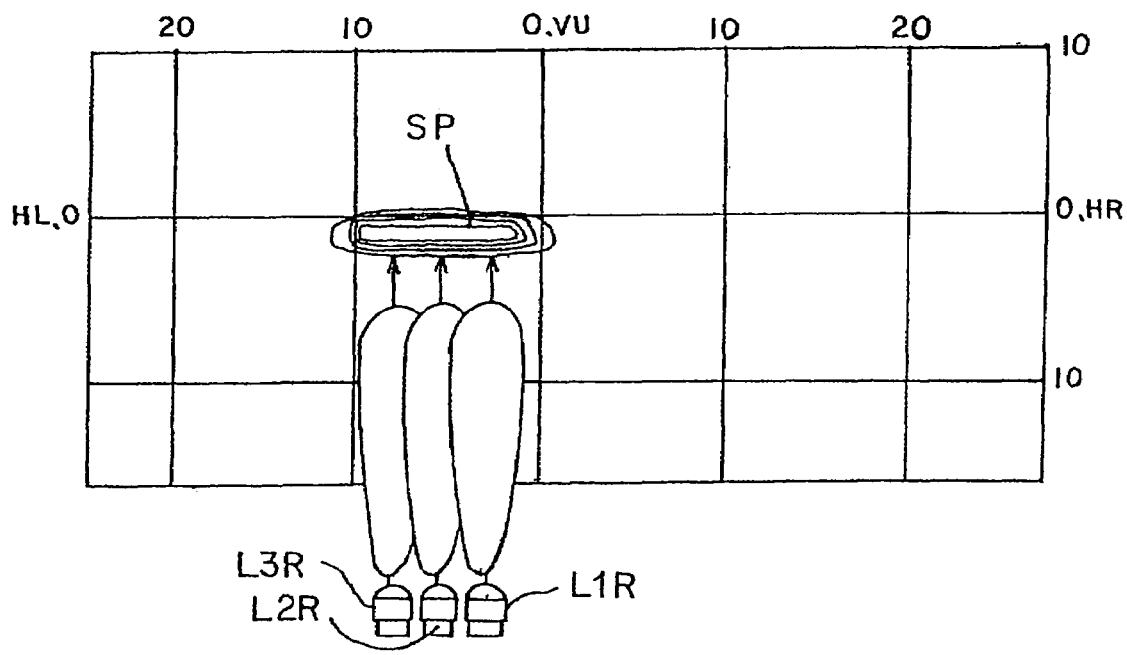
FIG. 22 is an explanatory drawing showing the three variable spot lamp units on the right side respectively outputting a 100 percent light flux, and the variable spot light distribution pattern shown on a screen under such a state.
Figure 23:
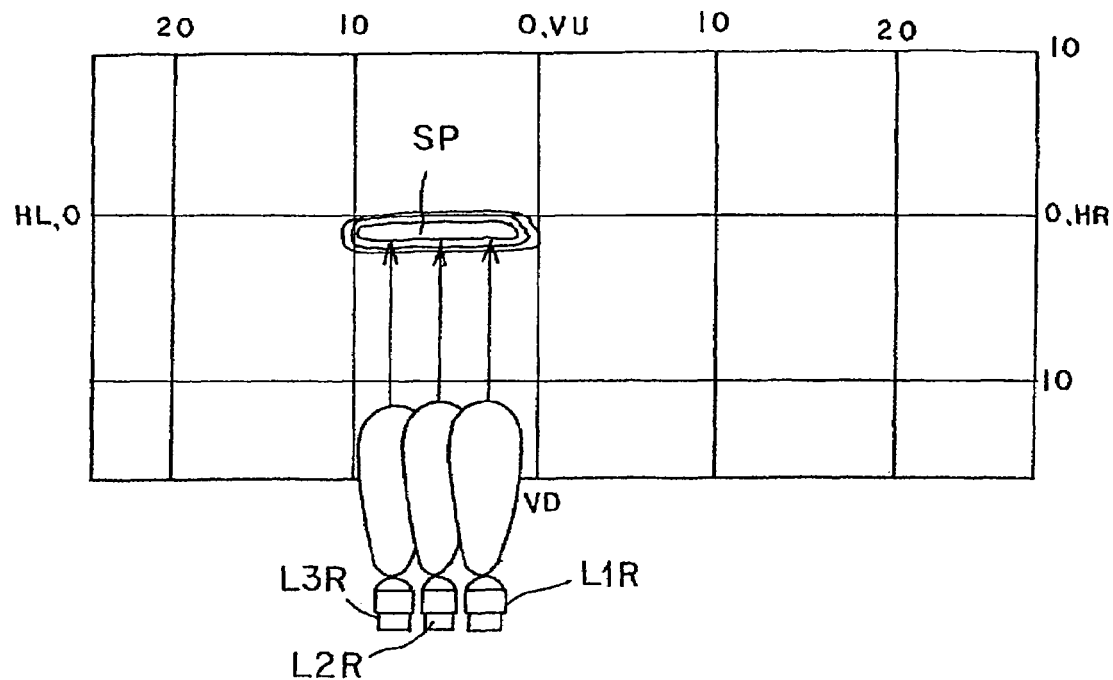
FIG. 23 is an explanatory drawing showing the three variable spot lamp units on the right side respectively outputting a 50 percent light flux, and the variable spot light distribution pattern shown on a screen under such a state.
Figure 24:
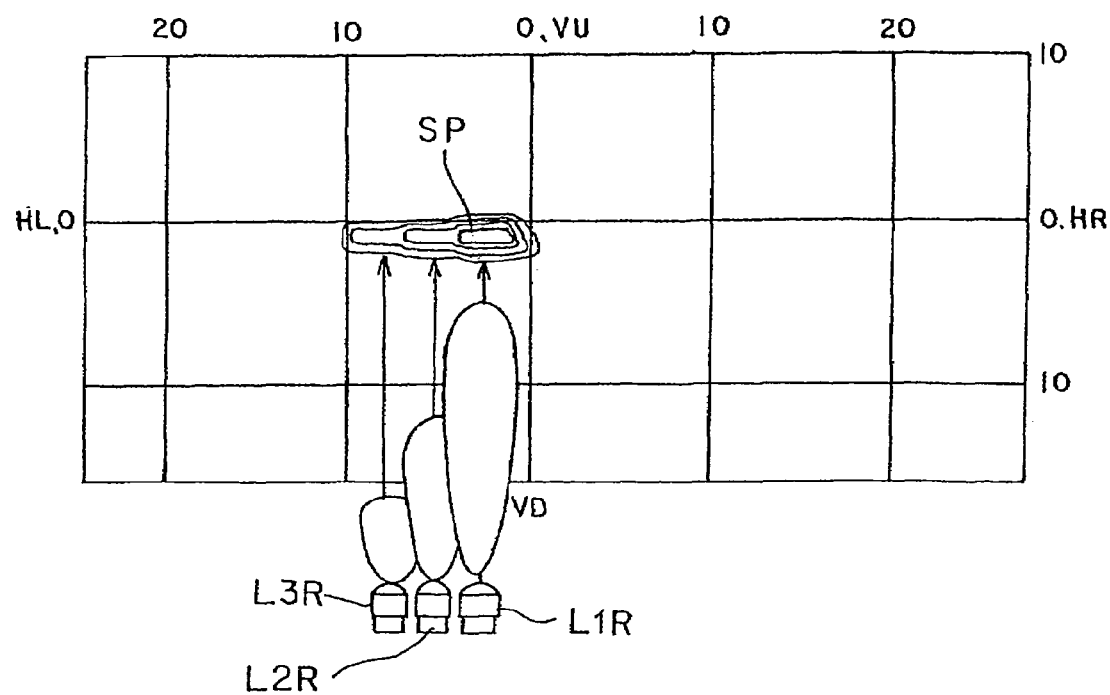
FIG. 24 is an explanatory drawing showing the three variable spot lamp units on the right side respectively outputting a 10 percent, 50 percent, and 100 percent light flux, and the variable spot light distribution patterns shown on a screen under those states.

Further, the spot light distribution pattern SP (SP1, SP2, and SP3) can be changed into various different spot light distribution patterns through control by the control unit 38, via the three variable spot lamp units L1R, L2R, and L3R on the right side RH and the three variable spot lamp units L1L, L2L, and L3L on the left side LH. Specifically, the control unit 38 can control the light intensity of the three variable spot lamp units L1R, L2R, and L3R on the right side RH and the three variable spot lamp units L1L, L2L, and L3L on the left side LH so as to vary in a range of 0 percent to 100 percent, altogether or independently. Also, the optical axes Z1-Z1, Z2-Z2, and Z3-Z3 of the three variable spot lamp units L1R, L2R, and L3R on the right side RH and the three variable spot lamp units L1L, L2L, and L3L on the left side LH can be rotated to the left or right, altogether or independently. As a result, an extensive variety of different spot light distribution patterns can be obtained. For example, as shown in FIG. 22, the output light flux of the three variable spot lamp units L1R, L2R, and L3R on the right side RH can be set at 100 percent or, as shown in FIG. 23, the output light flux of the three variable spot lamp units L1R, L2R, and L3R on the right side RH can be set at 50 percent, and further the output light flux of the three variable spot lamp units L1R, L2R, and L3R on the right side RH can be set at 10 percent, 50 percent and 100 percent respectively, as shown in FIG. 24.

Figure 25:
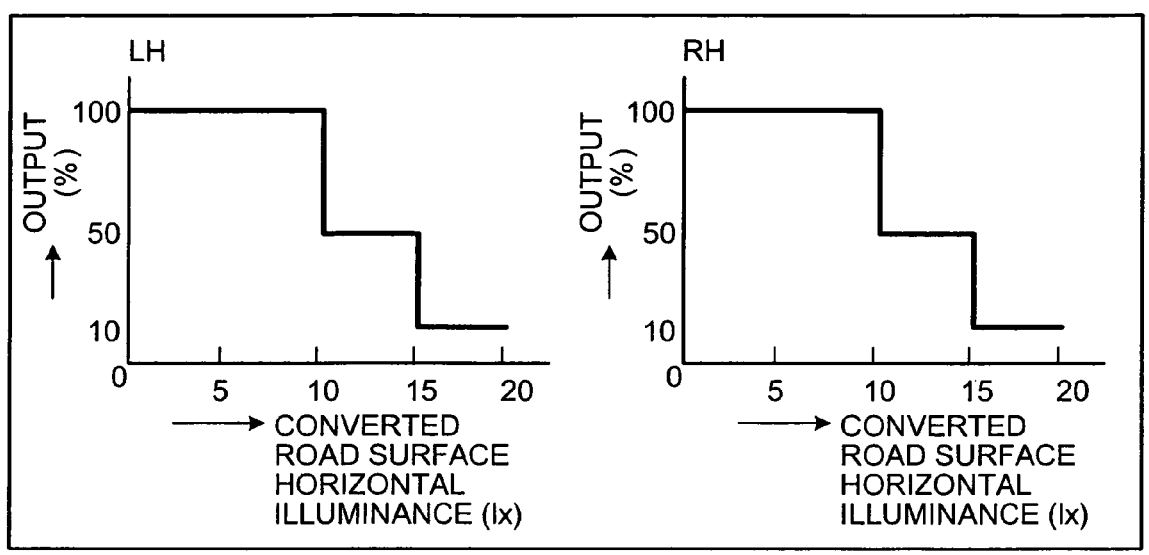
FIG. 25 includes explanatory graphs showing a control algorithm of an output light flux of the variable spot lamp unit, for driving on a suburban road, driving on a busy downtown street, and driving on an ordinary urban street at night.
Figure 26:
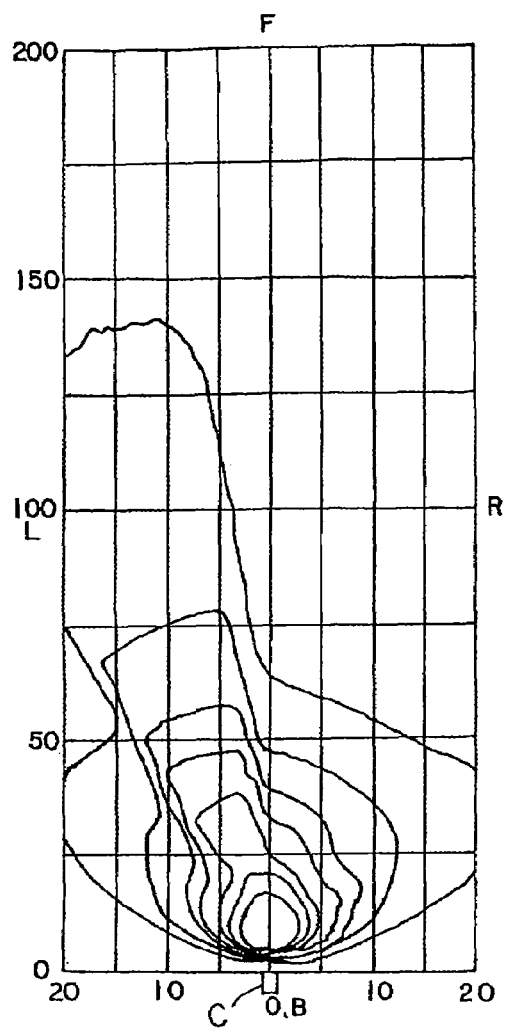
FIG. 26 is an explanatory graph showing a light distribution pattern of the 100 percent output light flux of the variable spot lamp units, when driving on a suburban road at night.

The following passages refer to a control algorithm shown in FIG. 25, on the intensity (illuminance) control of the spot light distribution pattern SP for driving on a suburban road, a busy downtown street and an ordinary urban street at night. FIG. 25 is an explanatory graph showing a control correlation (control algorithm) between the output light flux (vertical axis: percent) of the variable spot lamp units L1R, L2R, and L3R on the right side RH and the variable spot lamp units L1L, L2L, and L3L on the left side LH and a converted road surface horizontal illuminance (horizontal axis: lx) calculated by the brightness sensor 35 from the horizontal illuminance on the road surface. As is the case with FIG. 25, 10 lx of the converted road surface horizontal illuminance is set as a first threshold value, and 15 lx of the converted road surface horizontal illuminance is set as a second threshold value. When the converted road surface horizontal illuminance is below 10 lx, it is assumed that the vehicle is running on a suburban road and the output light flux is set at 100 percent. When the converted road surface horizontal illuminance is 10 lx or more but below 15 lx, it is assumed that the vehicle is running on an ordinary urban street and the output light flux is set at 50 percent. Further, when the converted road surface horizontal illuminance is 15 lx or more, it is assumed that the vehicle is running on a busy downtown street and the output light flux is set at 10 percent. The control unit 38 thus controls the output light flux of the variable spot lamp units L1R, L2R, and L3R on the right side RH and the variable spot lamp units L1L, L2L, and L3L on the left side LH based on the signal from the brightness sensor, according to the control algorithm shown in FIG. 25, to thereby variably control the intensity (illuminance) of the spot light distribution pattern SP.

Referring now to FIGS. 26 to 29, the intensity (illuminance) control of the spot light distribution pattern SP for driving on a suburban road, a busy downtown street, and an ordinary urban street at night will be described.

First, the control for driving on the suburban road at night will be described. In general, suburban roads are not provided with sufficient infrastructure such as road illumination, and hence the ambient environment of the vehicle C is dark, while the driving speed tends to be faster because of relatively less traffic. Accordingly, by driving of the vehicle C on a suburban road at night, long-distance visibility is an important factor. On the other hand, a high-beam light distribution pattern (not shown) is seldom utilized, because vehicle C often encounters a preceding vehicle or an oncoming vehicle.

Figure 27:
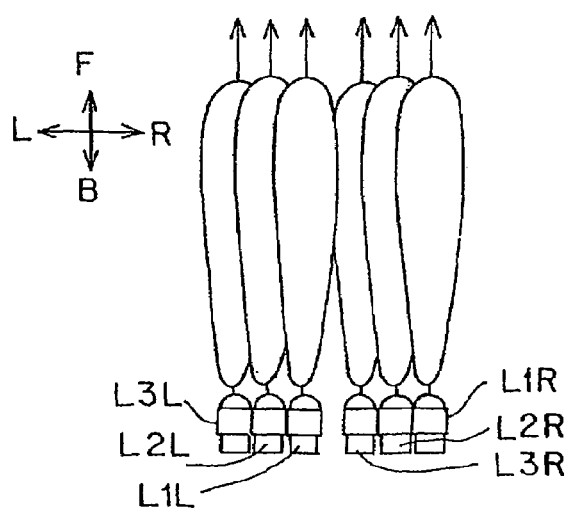
FIG. 27 is an explanatory drawing showing the variable spot lamp units outputting the 100 percent light fluxes, for driving on a suburban road at night.
Figure 28:
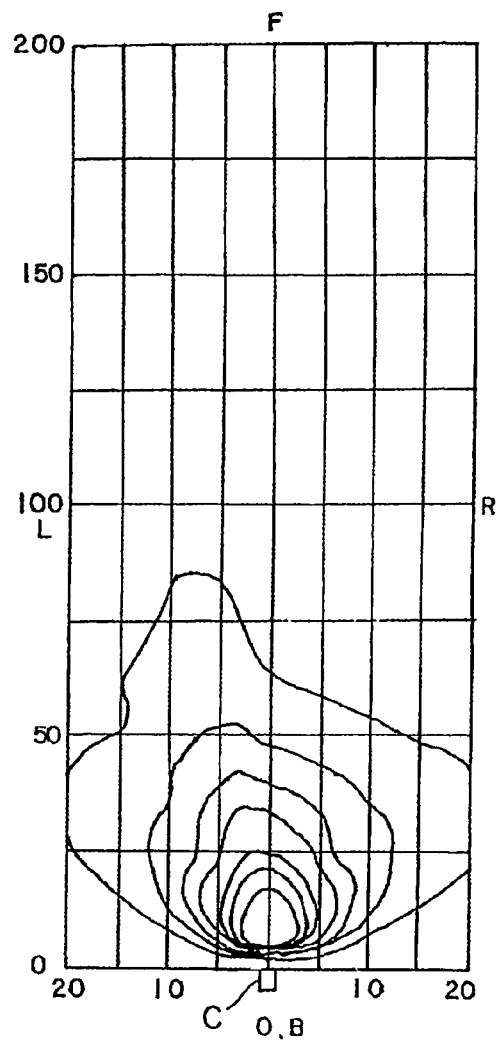
FIG. 28 is an explanatory graph showing a light distribution pattern of the 10 percent output light flux of the variable spot lamp units, when driving on a busy downtown street at night.

When the converted road surface horizontal illuminance is below 10 lx, it is assumed that the vehicle is running on a suburban road and the output light flux of the variable spot lamp units L1R, L2R, and L3R on the right side RH and the variable spot lamp units L1L, L2L, and L3L on the left side LH is set at 100 percent as shown in FIG. 27, according to the control algorithm shown in FIG. 25. Therefore, since the output light flux of the spot light distribution pattern SP is set at 100 percent which is the standard status, the low-beam light distribution pattern LP and the spot light distribution pattern SP shown in FIG. 20 are obtained. The low-beam light distribution pattern LP and the spot light distribution pattern SP shown in FIG. 20 has the foregoing light distribution characteristic (i.e. the light strip of approximately 20000 cd or more at the left from the elbow point EP). Consequently, the light distribution pattern shown in FIG. 20 is an ideal light distribution pattern that provides excellent long-distance visibility, and is hence very effective and appropriate for driving on a suburban road at night as is apparent from the light distribution pattern on the road shown in FIG. 26.

Next, the second description covers driving on a busy downtown street at night. On a busy downtown street at night, the road is sufficiently illuminated and long-distance visibility is secured. However, the road illumination is primarily directed to the roadway, and pedestrian walkways are often insufficiently illuminated. Accordingly, while driving on the busy downtown street at night the long-distance light distribution by the 100 percent output light flux of the spot light distribution pattern SP is not required unlike on a suburban road, and just the light distribution toward the pedestrian walkway, i.e. the low-beam light distribution pattern LP of the fixed light distribution shown in FIG. 18 is satisfactory. Also, when driving on a busy downtown street, vehicle C has to frequently change direction and posture such as turning to the left or right and increasing or decreasing the speed, and hence the spot light distribution pattern SP of the variable light distribution is often oriented to a direction that casts a glare toward drivers on oncoming vehicles or vehicles that exist in the turning direction. Further, during a traffic jam or slow speeds the temperature inside the lamp units increases, thus imposing a severe operating condition on the semiconductor light source 1.

Figure 29:
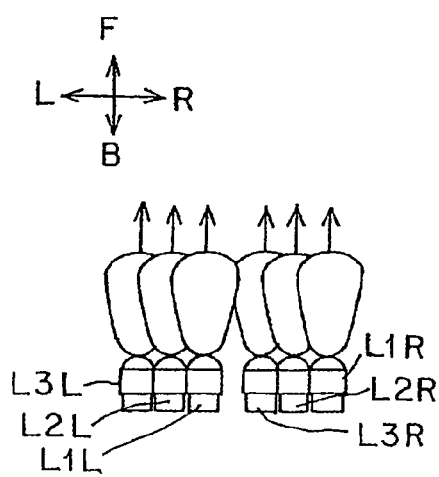
FIG. 29 is an explanatory drawing showing the variable spot lamp units outputting the 10 percent light fluxes, for driving on a busy downtown street at night.

When the converted road surface horizontal illuminance is 15 lx or more, it is assumed that the vehicle is running on a busy downtown street at night and the output light flux of the variable spot lamp units L1R, L2R, and L3R on the right side RH and the variable spot lamp units L1L, L2L, and L3L on the left side LH is set at 10 percent as shown in FIG. 29, according to the control algorithm shown in FIG. 25. Accordingly, since the output light flux of the spot light distribution pattern SP is set at 10 percent, unnecessary excessive light emission can be avoided, and glare against other vehicles as well as an increase in temperature inside the lamp unit and in power consumption can be prevented. Moreover, as is apparent from the light distribution pattern on the road shown in FIG. 28, the light distribution pattern that is very effective and appropriate for driving on the busy downtown street at night can be obtained.

Here, the reason that the output light flux of the spot light distribution pattern SP is set at 10 percent lies in the light-emission area and appearance of the lamps when a part of the lamps is turned on, because, when the output light flux is set at 0 percent, the variable spot lamp units L1R, L2R, L3R, L1L, L2L, and L3L on the middle level are turned off while the fixed headlamps L0, L0U, and L0D on the upper and lower levels are turned on.

Further, the case of the driving on an ordinary urban street at night will be described. An ordinary urban street at night is generally darker than a busy downtown street at night, but brighter than a suburban road at night. Accordingly, when the converted road surface horizontal illuminance is 10 lx or more but below 15 lx, it is assumed that the vehicle is running on an ordinary urban street at night and the output light flux of the variable spot lamp units L1R, L2R, and L3R on the right side RH and the variable spot lamp units L1L, L2L, and L3L on the left side LH is set at 50 percent, according to the algorithm shown in FIG. 25.

Figure 30:
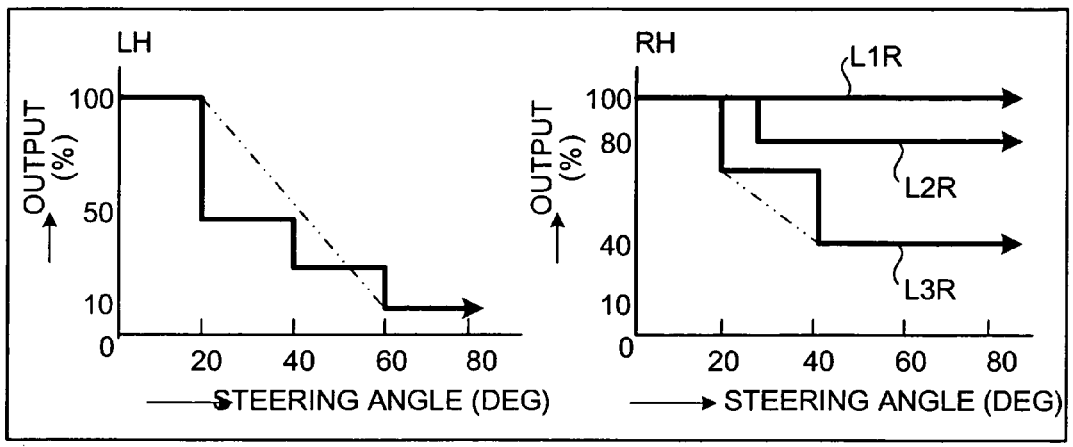
FIG. 30 is an explanatory graph showing a control algorithm of an output light flux of the variable spot lamp unit, in the case of an additional steering operation while driving on a winding road at night.
Figure 31:
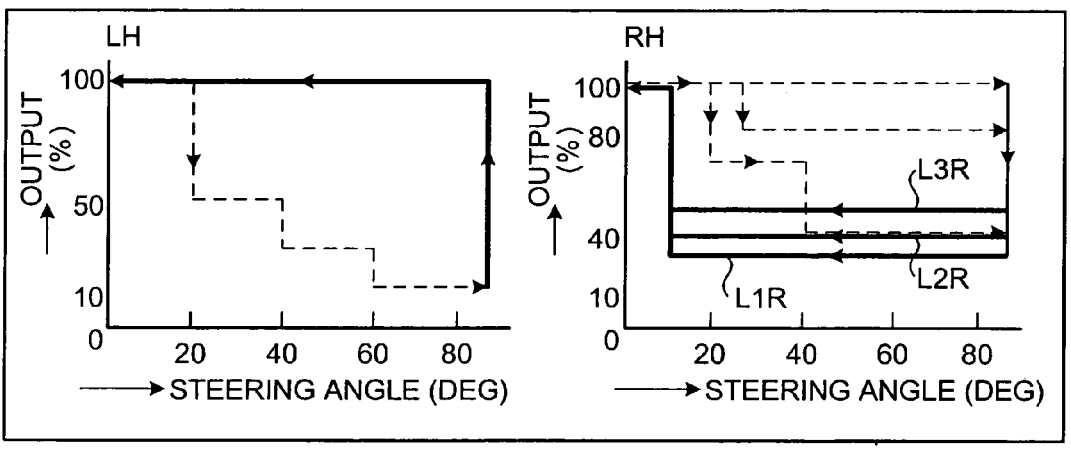
FIG. 31 is an explanatory graph showing a control algorithm of an output light flux of the variable spot lamp unit, in the case of a reverse steering operation while driving on a winding road at night.

Hereunder, the intensity (illuminance) control of the spot light distribution pattern SP for driving on a winding road at night will be described, based on the control algorithm shown in FIGS. 30 to 32. FIG. 30 is an explanatory graph showing a control correlation (control algorithm) between the output light flux (vertical axis: percent) of the variable spot lamp units L1R, L2R, and L3R on the right side RH and the variable spot lamp units L1L, L2L, and L3L on the left side LH and a steering angle in an additional steering direction (horizontal axis: degrees) obtained through the steering angle signal and steering direction signal from the steering angle sensor 33. Likewise, FIG. 31 is an explanatory graph showing a control correlation (control algorithm) between the output light flux (vertical axis: percent) of the variable spot lamp units L1R, L2R, and L3R on the right side RH and the variable spot lamp units L1L, L2L, and L3L on the left side LH and a steering angle in a reverse steering direction (horizontal axis: degrees) obtained through the steering angle signal and steering direction signal from the steering angle sensor 33. Further, FIG. 32 is an explanatory graph showing a control correlation (control algorithm) between a rotation angle, i.e. a left swivel angle and a right swivel angle (vertical axis: degrees) of the variable spot lamp units L1R, L2R, and L3R on the right side RH and the variable spot lamp units L1L, L2L, and L3L on the left side LH and a left steering angle and a right steering angle (horizontal axis: degrees) obtained through the steering angle signal and steering direction signal from the steering angle sensor 33.

As is apparent from FIG. 30, when the steering angle in the additional steering direction (right steering angle) has reached 20 degrees, the output light flux of the variable spot lamp units L1L, L2L, and L3L on the left side LH is reduced to 50 percent from 100 percent, and the output light flux of the third variable spot lamp unit L3R on the right side RH is reduced to 75 percent from 100 percent. Also, when the steering angle in the additional steering direction (right steering angle) has reached approximately 26 degrees, the output light flux of the second variable spot lamp unit L2R on the right side RH is reduced to 80 percent from 100 percent. Further, when the steering angle in the additional steering direction (right steering angle) has reached 40 degrees, the output light flux of the variable spot lamp units L1L, L2L, and L3L on the left side LH is reduced to 30 percent from 50 percent, and the output light flux of the third variable spot lamp unit L3R on the right side RH is reduced to 40 percent from 75 percent. Still further, when the steering angle in the additional steering direction (right steering angle) has reached 60 degrees, the output light flux of the variable spot lamp units L1L, L2L, and L3L on the left side LH is reduced to 10 percent from 30 percent. Here, such control in the additional steering direction may be performed linearly as indicated by the double dashed chain lines in FIG. 30.

As is apparent from FIG. 31, when the reverse steering action is started, the output light flux of the variable spot lamp units L1L, L2L, and L3L on the left side LH is instantaneously increased to 100 percent; the output light flux of the first variable spot lamp unit L1R on the right side RH is instantaneously reduced to 30 percent from 100 percent; the output light flux of the second variable spot lamp unit L2R on the right side RH is instantaneously reduced to 40 percent from 80 percent; and the output light flux of the third variable spot lamp unit L3R on the right side RH is instantaneously increased to 50 percent from 40 percent. Also, when the steering angle in the reverse steering direction (right steering angle) has reached 10 degrees, the output light flux of the first variable spot lamp unit L1R on the right side RH is increased to 100 percent from 30 percent; the output light flux of the second variable spot lamp unit L2R on the right side RH is increased to 100 percent from 40 percent; and the output light flux of the third variable spot lamp unit L3R on the right side RH is increased to 100 percent from 50 percent. Here, the dotted line arrows in FIG. 31 indicate the additional steering direction in FIG. 30.

Figure 32:
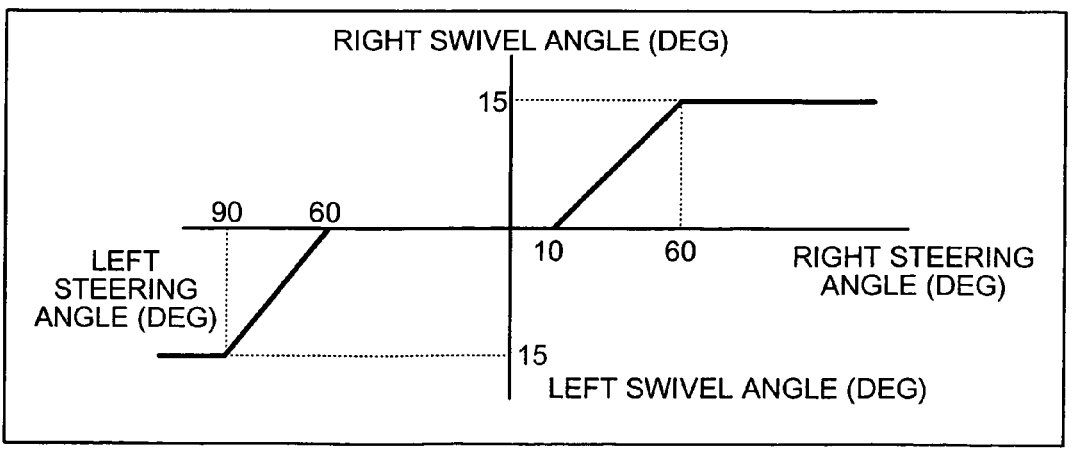
FIG. 32 is an explanatory graph showing a control algorithm of the swivel of the variable spot lamp unit in response to the steering operation.

Further, as is apparent from FIG. 32, when the right steering angle has reached 10 degrees, the variable spot lamp units L1R, L2R, and L3R on the right side RH oriented to a forward (front) direction start to rotate to the right. When the right steering angle has reached 60 degrees, the right swivel angle of the variable spot lamp units L1R, L2R, and L3R on the right side RH reaches 15 degrees, where the rotation to the right is stopped. On the contrary, when the right steering angle is put back below 60 degrees, the variable spot lamp units L1R, L2R, and L3R on the right side RH oriented to the right start to rotate to the left. When the right steering angle is put back below 10 degrees, the right swivel angle of the variable spot lamp units L1R, L2R, and L3R on the right side RH reaches 0 degrees, where the rotation to the left is stopped. Likewise, when the left steering angle has reached 60 degrees, the variable spot lamp units L1L, L2L, and L3L on the left side LH oriented to a forward (front) direction start to rotate to the left. When the left steering angle has reached 90 degrees, the left swivel angle of the variable spot lamp units L1L, L2L, and L3L on the left side LH reaches 15 degrees, where the rotation to the left is stopped. On the contrary, when the left steering angle is put back below 90 degrees, the variable spot lamp units L1L, L2L, and L3L on the left side LH oriented to the left start to rotate to the right. When the left steering angle is put back below 60 degrees, the left swivel angle of the variable spot lamp units L1L, L2L, and L3L on the left side LH reaches 0 degrees, where the rotation to the right is stopped. Here, while the variable spot lamp units L1R, L2R, and L3R on the right side RH and the variable spot lamp units L1L, L2L, and L3L on the left side LH are independently controlled by the foregoing variable control, the left and right variable spot lamp units may be controlled altogether simultaneously.

Thus, the control unit 38 controls the output light flux from the variable spot lamp units L1R, L2R, and L3R on the right side RH and the variable spot lamp units L1L, L2L, and L3L on the left side LH, as well as the rotation angle of the variable spot lamp units L1R, L2R, and L3R on the right side RH and/or the variable spot lamp units L1L, L2L, and L3L on the left side LH, based on the steering angle signal and the steering direction signal from the steering angle sensor 33 and according to the control algorithm shown in FIGS. 30 to 32, to thereby variably control the intensity (illuminance) and direction (profile) of the spot light distribution pattern SP.

Hereunder, the intensity (illuminance) control and direction control of the spot light distribution pattern SP for driving on a winding road at night, particularly along a right curve, will be described referring to FIGS. 33 to 36. First, when driving on a winding road at night, particularly along a right curve, the line of vision of the driver (solid line arrows in FIGS. 33 and 35) is directed to a region above the lower horizontal cutoff line CL3 (provided to prevent glare against an oncoming vehicle; refer to FIGS. 3, 5, and 7) at the right of the elbow point EP of the low-beam light distribution pattern LP. Accordingly, it is effective to horizontally move a portion of the light distribution at the left of the elbow point EP and the oblique cutoff line CL2 and above the lower horizontal cutoff line CL3 of the low-beam light distribution pattern LP to the right, in other words to swivel the elbow point EP in the direction of the line of vision according to the right curve, to thereby secure sufficient visibility. In this process, when the entire low-beam light distribution pattern LP is swiveled to the right, especially when the entire low-beam light distribution pattern of the lamps on one side, for example, on the right side is swiveled, or when the entire low-beam light distribution pattern of the lamps on the right side and the entire low-beam light distribution pattern of the lamps on the left side are asymmetrically swiveled, the overlapping portion of the light distribution from the left side lamps and from the right side lamps of the vehicle C varies as a whole. This often incurs uneven light distribution and a void portion at various points in the low-beam light distribution pattern. Accordingly, swiveling only the spot light distribution pattern SP with respect to the low-beam light distribution pattern LP significantly reduces the uneven light distribution and void portions, and allows distributing the light accurately to the region where the light is supposed to be distributed (slightly above the lower horizontal cutoff line CL3 at the right of the elbow point EP of the low-beam light distribution pattern LP, where the driver's line of vision is directed). Such control provides a light distribution pattern that is very effective for driving on a winding road.

Figure 33:
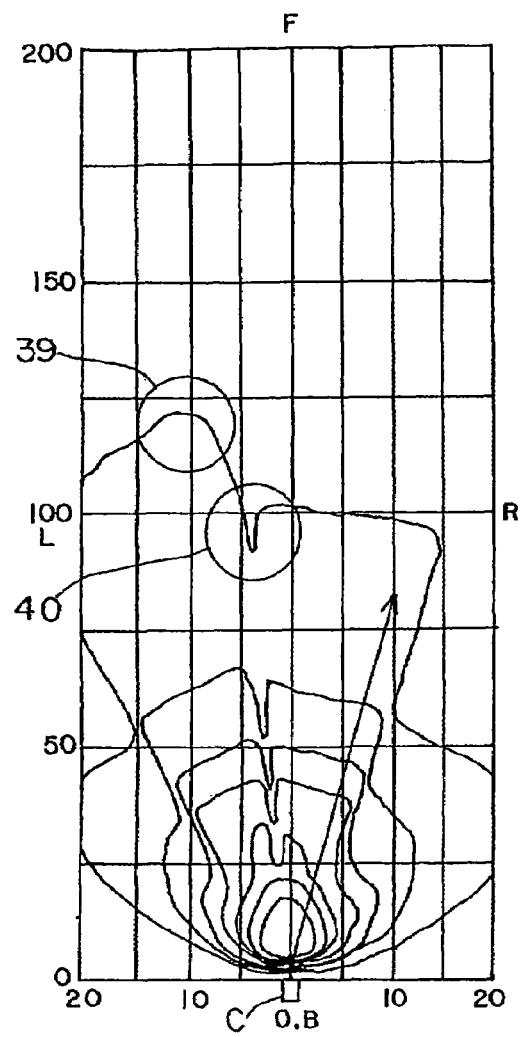
FIG. 33 is an explanatory graph showing a light distribution pattern on the road, of the 100 percent light fluxes output by the variable spot lamp units with the right side variable spot lamp unit swiveled to the right, when driving along a right curve at night.
Figure 34:
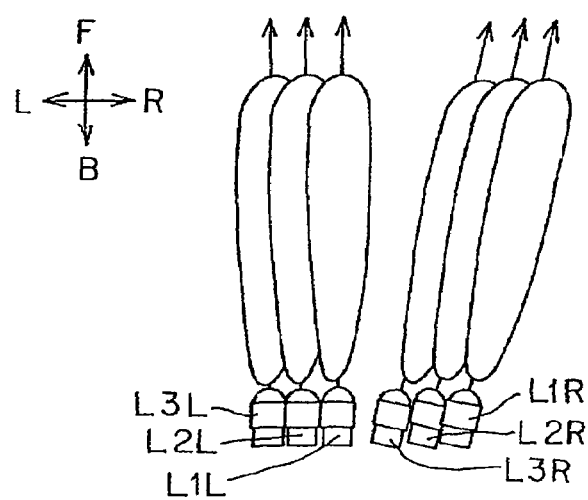
FIG. 34 is an explanatory drawing showing the variable spot lamp units outputting the 100 percent light fluxes, with the right side variable spot lamp unit swiveled to the right, when driving along a right curve at night.

Here, the swiveling motion of the spot light distribution pattern SP may be performed by either of the variable spot lamp units L1R, L2R, and L3R on the right side RH or the variable spot lamp units L1L, L2L, and L3L on the left side LH, by the variable spot lamp units on the both sides, or may be asymmetrically performed by the variable spot lamp units on the both sides. However, for example, when only the variable spot lamp units L1R, L2R, and L3R on the right side RH are swiveled to the right by approximately 15 degrees as shown in FIG. 34, valleys or void portions 40 are formed between the swiveled light distribution and the non-swiveled light distribution, and in addition, the non-swiveled light distribution intensely illuminates a region 39 far out of the turning direction of the vehicle C (the opposite side to the driver's line of vision, in a right curve) as shown in FIG. 33, which is unfavorable. Here, in FIGS. 33 and 34, the output light flux from the variable spot lamp units L1R, L2R, and L3R on the right side RH, and the output light flux from the variable spot lamp units L1L, L2L, and L3L on the left side LH are both set at 100 percent.

Figure 35:
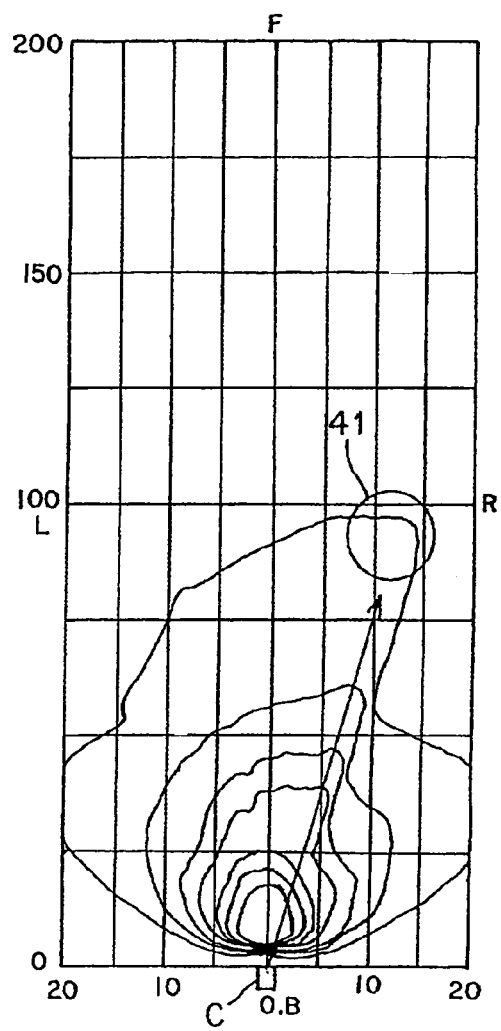
FIG. 35 is an explanatory graph showing a light distribution pattern on the road, of the 40 percent, 80 percent, and 100 percent light fluxes respectively output by the variable spot lamp units, with the right side variable spot lamp units swiveled to the right and the left side variable spot lamp units respectively outputting the 10 percent light flux, when driving along a right curve at night.
Figure 36:
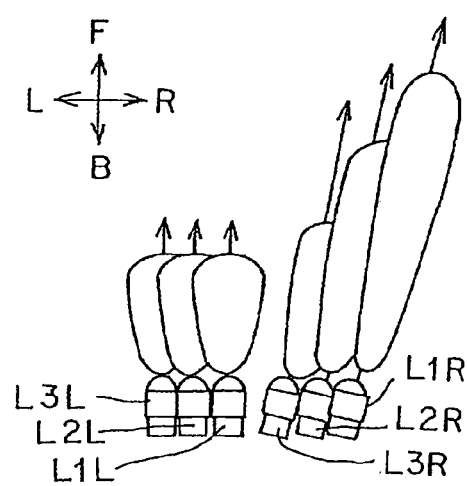
FIG. 36 is an explanatory drawing showing the variable spot lamp units respectively outputting the 40 percent, 80 percent, and 100 percent light fluxes, with the right side variable spot lamp units swiveled to the right and the left side variable spot lamp units respectively outputting the 10 percent light flux, when driving along a right curve at night.

Accordingly, it is preferable to control the spot light distribution pattern SP based on the control algorithm shown in FIG. 30, when driving along a right curve at night. For example, when the right steering angle has reached 60 degrees, only the variable spot lamp units L1R, L2R, and L3R on the right side RH are swiveled to the right by approximately 15 degrees, as shown in FIG. 36. Also, the output light fluxes are independently controlled, such as setting the output light flux of the first variable spot lamp unit L1R on the right side RH at 100 percent, the output light flux of the second variable spot lamp unit L2R at 80 percent and the output light flux of the third variable spot lamp unit L3R at 40 percent. In contrast, the output light flux of the non-swiveled variable spot lamp units L1L, L2L, and L3L on the left side LH is set at 10 percent equally. Such an arrangement eliminates the valleys and void portions and allows intensely illuminating the region 41 in the turning direction of the vehicle C (region in the direction of the driver's line of vision, in a right curve) as shown in FIG. 35, thus providing a light distribution pattern that is quite desirable and very effective for driving along a right curve at night.

Figure 37:
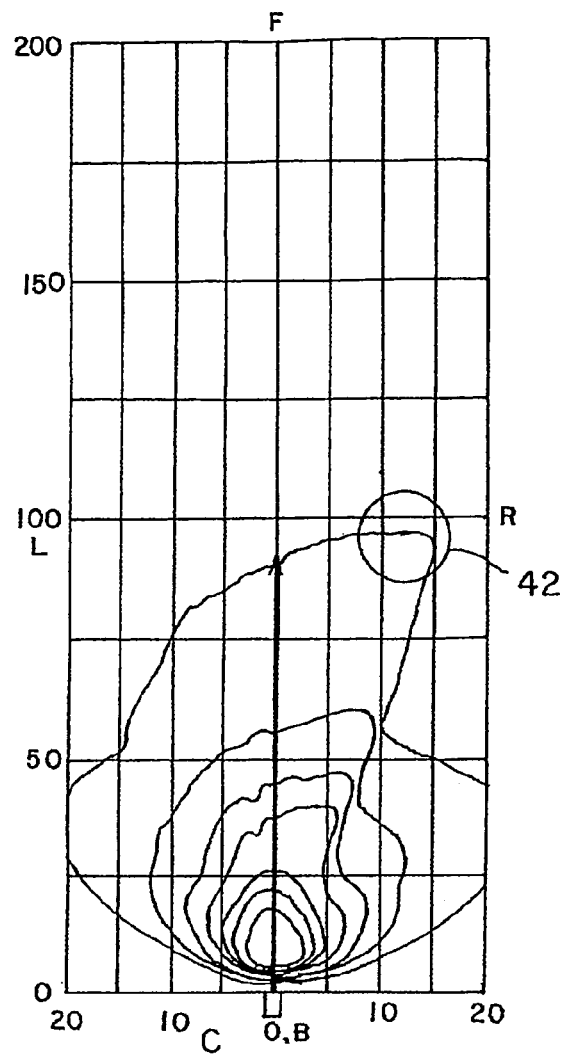
FIG. 37 is an explanatory graph showing a light distribution pattern on the road, of the 40 percent, 80 percent, and 100 percent light fluxes respectively output by the variable spot lamp units, with the right side variable spot lamp units swiveled to the right and the left side variable spot lamp units respectively outputting the 10 percent light flux, when entering a straight road from a right curve at night.
Figure 38:
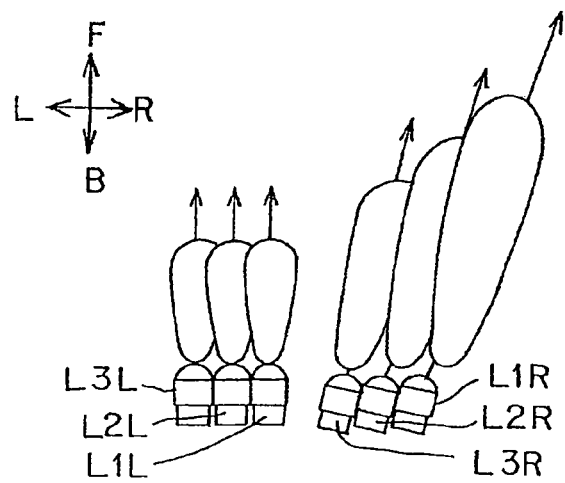
FIG. 38 is an explanatory drawing showing the variable spot lamp units respectively outputting the 40 percent, 80 percent, and 100 percent light fluxes, with the right side variable spot lamp units swiveled to the right and the left side variable spot lamp units respectively outputting the 10 percent light flux, when entering a straight road from a right curve at night.

Then referring to FIGS. 37 to 40, the intensity (illuminance) control and direction control of the spot light distribution pattern SP for driving on a winding road at night, for example, when entering a straight road from a right curve, will be described hereunder. First, when the steering wheel starts to be reversely rotated, the driver's line of vision (refer to the solid line arrows in FIGS. 37 and 39) is already directed to the straight portion of the road. If the light distribution control of the spot light distribution pattern SP (refer to FIG. 38) remains the same as the control shown in FIG. 36, the region 42 opposite the driver's line of vision is intensely illuminated as shown in FIG. 37, which is unfavorable.

Figure 39:
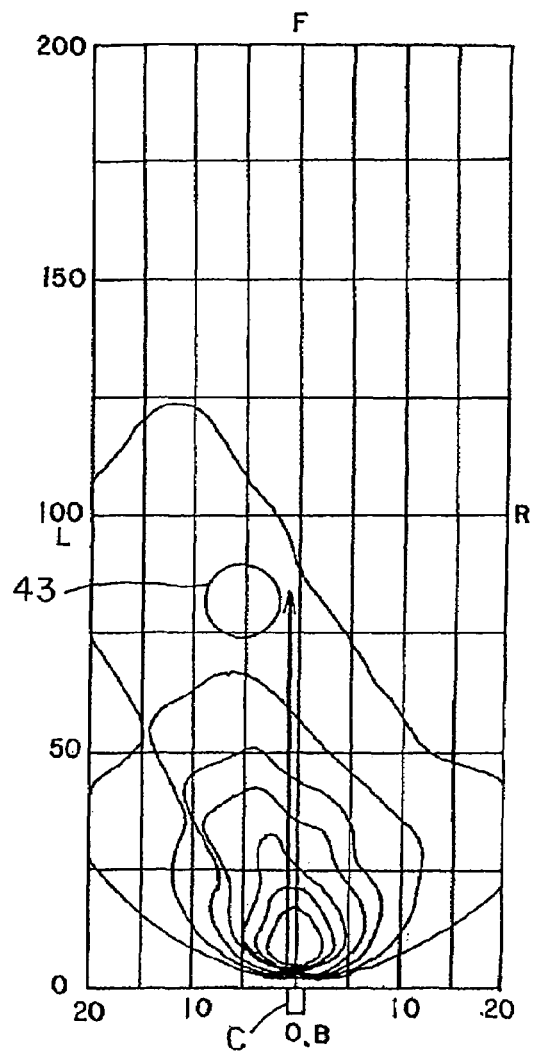
FIG. 39 is an explanatory graph showing a light distribution pattern on the road, of the 30 percent, 40 percent and 50 percent light fluxes respectively output by the variable spot lamp units, with the right side variable spot lamp unit swiveled to the right and the left side variable spot lamp units respectively outputting the 100 percent light flux, when entering a straight road from a right curve at night.
Figure 40:
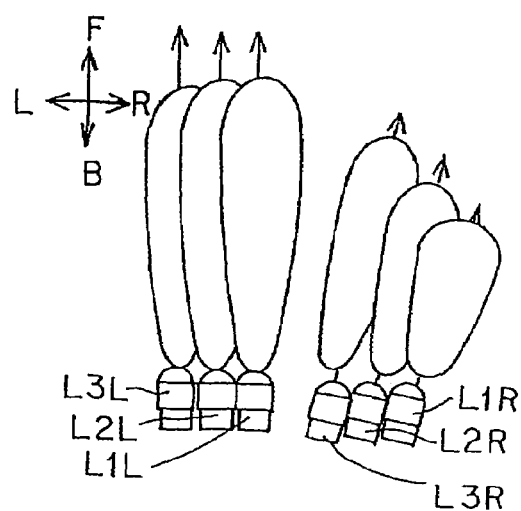
FIG. 40 is an explanatory drawing showing the variable spot lamp units respectively outputting the 30 percent, 40 percent, and 50 percent light fluxes, with the right side variable spot lamp units swiveled to the right and the left side variable spot lamp units respectively outputting the 100 percent light flux, when entering a straight road from a right curve at night.

Accordingly, when entering a straight road from a right curve at night, it is preferable to control the spot light distribution pattern SP based on the control algorithm shown in FIG. 31. More specifically, for example, when the reverse steering motion is started, the output light flux of the non-swiveled variable spot lamp units L1L, L2L, and L3L on the left side LH is instantaneously set at 100 percent equally. Concurrently, the output light flux of the swiveled first variable spot lamp unit L1R on the right side RH is reduced to 30 percent from 100 percent; the output light flux of the second variable spot lamp unit L2R on the right side RH is reduced to 40 percent from 80 percent; and the output light flux of the third variable spot lamp unit L3R on the right side RH is increased to 50 percent from 40 percent, all instantaneously and independently. Such an arrangement instantaneously turns the light distribution pattern shown in FIG. 35 into the light distribution pattern shown in FIG. 39, thereby following up the instantaneous movement of the driver's line of vision. Moreover, the region 43 ahead of the line of vision is intensely illuminated as shown in FIG. 39, and thus the light distribution pattern quite desirable and very effective in entering a straight road from a right curve at night can be obtained. Here, in the light distribution control shown in FIG. 40, when the right steering angle has reached 10 degrees, the output light flux of the swiveled first variable spot lamp unit L1R on the right side RH is increased to 100 percent from 30 percent; the output light flux of the second variable spot lamp unit L2R on the right side RH is increased to 100 percent from 40 percent; and the output light flux of the third variable spot lamp unit L3R on the right side RH is increased to 100 percent from 50 percent, all instantaneously and independently, according to the control algorithm shown in FIG. 31. Also, the variable spot lamp units L1R, L2R, and L3R on the right side RH swiveled to the right are oriented to the front, according to the control algorithm shown in FIG. 32.

Figure 41:
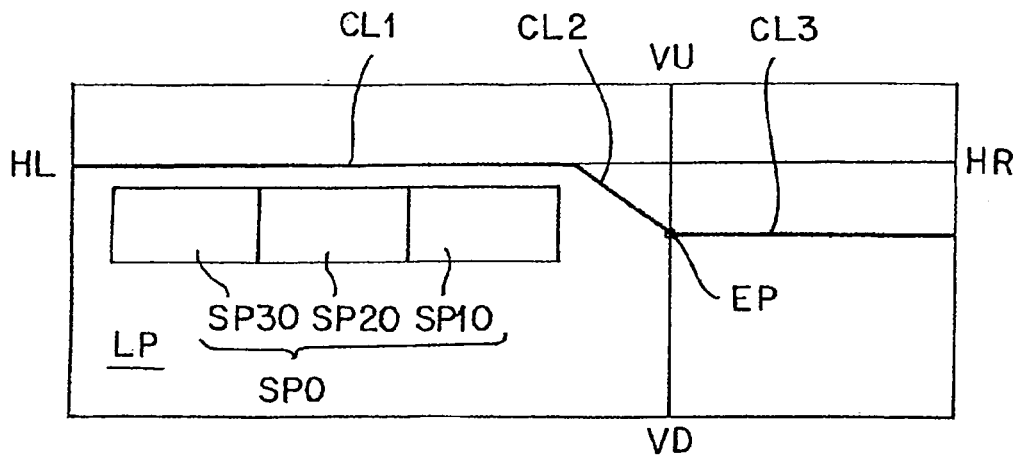
FIG. 41 is an explanatory drawing of an overview of the low-beam light distribution pattern in which the spot light distribution pattern is combined, shown on a screen.
Figure 42:
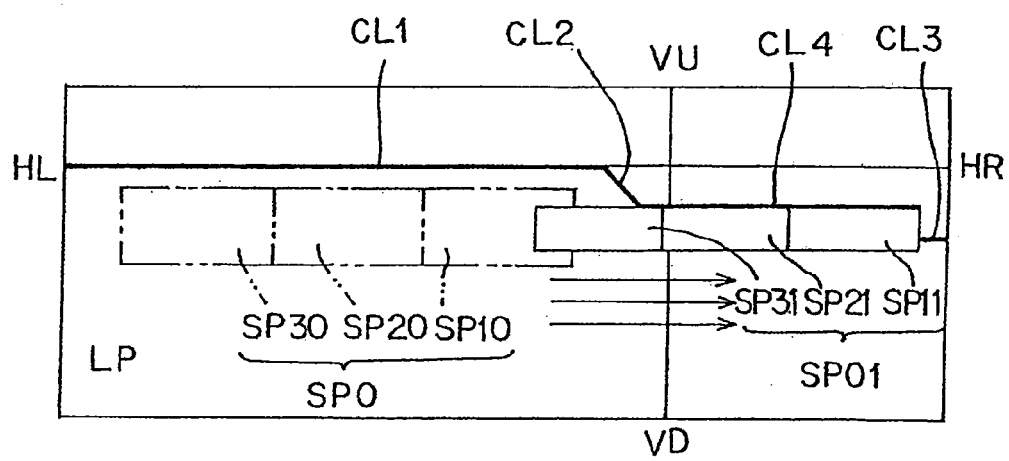
FIG. 42 is an explanatory drawing of a transition state from the low-beam light distribution pattern to the first motorway light distribution pattern, shown on a screen.
Figure 43:
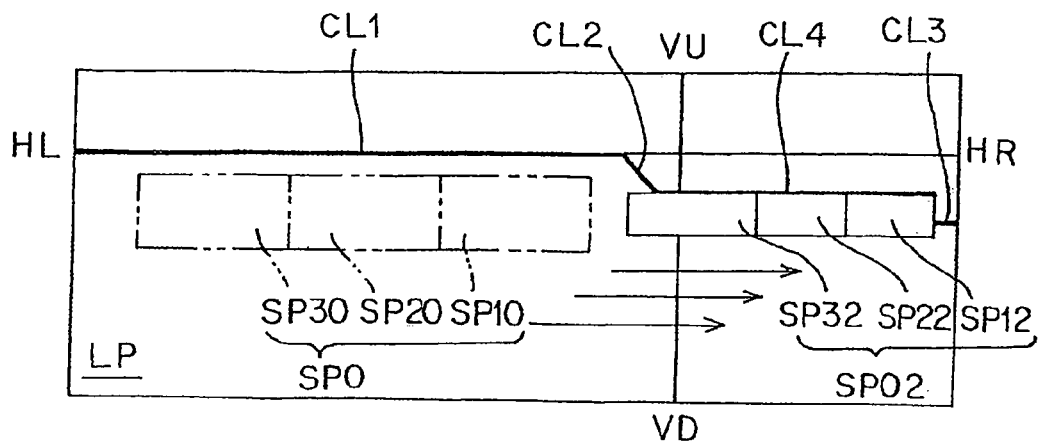
FIG. 43 is an explanatory drawing of a transition state from the low-beam light distribution pattern to the second motorway light distribution pattern, shown on a screen.

Hereunder, the control of the spot light distribution pattern during high-speed driving at night will be described referring to FIGS. 41 to 43. FIG. 41 is an explanatory drawing of the low-beam light distribution pattern appropriate for an ordinary drive, shown on a screen; FIG. 42 is an explanatory drawing of a first motorway low-beam light distribution pattern MP1 appropriate for high-speed driving, shown on the screen; and FIG. 43 is an explanatory drawing of a second motorway low-beam light distribution pattern MP2 appropriate for high-speed driving, shown on the screen. In these drawings, the same numerals as those in FIGS. 1 to 40 designate the same constituents.

A first spot light distribution pattern SP10 in FIGS. 41 to 43 does not include a side disposed along the oblique cutoff line CL2 of the low-beam light distribution pattern LP, unlike the first spot light distribution pattern SP1 obtained from the first spot lamp unit L1, the first variable spot lamp unit L1R on the right side, and the first variable spot lamp unit L1L on the left side. In other words, the first spot light distribution pattern SP10 is a rectangular light distribution pattern having an upper side generally parallel to the horizontal cutoff lines CL1 and CL3 of the low-beam light distribution pattern LP, like the second variable spot lamp unit SP2 and the third variable spot lamp unit SP3 obtained from the second spot lamp unit L2 and the third spot lamp unit L3, the second variable spot lamp unit L2R on the right side and the third variable spot lamp unit L3R on the right side, and the second variable spot lamp unit L2L on the left side and the third variable spot lamp unit L3L on the left side. Here, the first spot light distribution pattern SP1 including the side disposed along the oblique cutoff line CL2 of the low-beam light distribution pattern LP may be employed, in place of the spot light distribution pattern SP10. Also, the spot light distribution patterns SP10, SP20, and SP30 are of a rectangular shape extended, in a left and right direction, for example, by an optical element, from the square shape according to the light emitting element 5.

The spot light distribution pattern SP0 formed by combining the first spot light distribution pattern SP10, the second spot light distribution pattern SP20, and the third spot light distribution pattern SP30 is disposed such that the upper side extends along the upper horizontal cutoff line CL1, and in a region on the left of the elbow point EP and the oblique cutoff line CL2 of the low-beam light distribution pattern LP. The spot light distribution pattern SP0 serves to achieve an ideal low-beam light distribution pattern LP that provides excellent long-distance visibility, like the spot light distribution pattern SP.

Also, the spot light distribution pattern SP0 is an image formed when semiconductor light source 1 and the lens 2 are relatively positioned as the first position shown in FIGS. 14 and 15 (where the focal point F0 of the lens 2 is located ahead of the light emitting element 5 of the semiconductor light source 1), and is a light distribution pattern of a slightly diffused (enlarged) image. When the relative position of the semiconductor light source 1 and the lens 2 is shifted to the second position shown in FIG. 16 (where the focal point F0 of the lens 2 substantially falls on the light emitting element 5 of the semiconductor light source 1), the spot light distribution pattern SP01 and SP02 (respectively including the first spot light distribution pattern SP11, the second spot light distribution pattern SP21, and the third spot light distribution pattern SP31, and the first spot light distribution pattern SP21, the second spot light distribution pattern SP22, and the third spot light distribution pattern SP32) are obtained in condensed (shrunk) images.

Further, the semiconductor light source 1 and the lens 2 are arranged such that the upper side of the condensed spot light distribution pattern SP01 and SP02 is located approximately 0.23 degrees below the left and right horizontal line HL-HR on the screen. Now, swiveling the condensed spot light distribution pattern SP01 and SP02, for example, to the right R lifts the upper side thereof to a level slightly above the lower horizontal cutoff line CL3 of the low-beam light distribution pattern LP, thus forming a new horizontal cutoff line, namely a middle cutoff line CL4.

Figure 44:
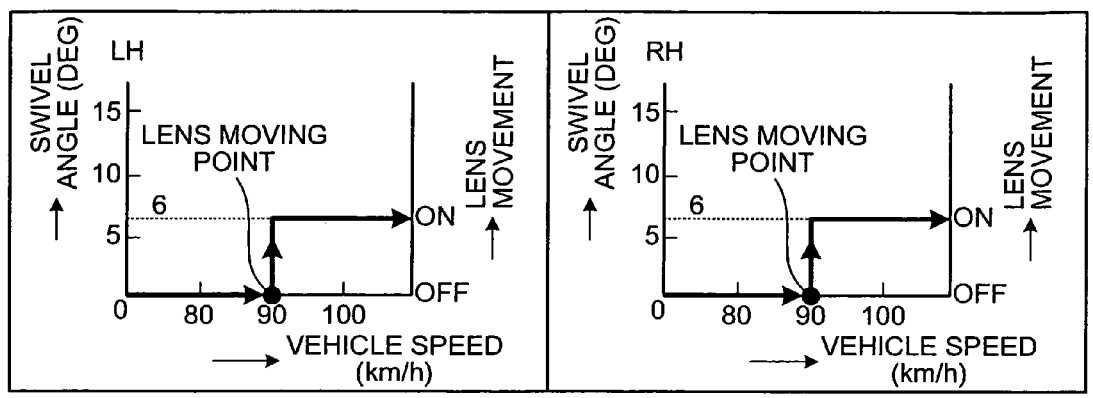
FIG. 44 includes explanatory graphs showing a control correlation (control algorithm) among the vehicle speed, lens movement, and swivel angle, for switching the variable spot lamp unit from the low-beam light distribution pattern to the first motorway light distribution pattern.
Figure 45:
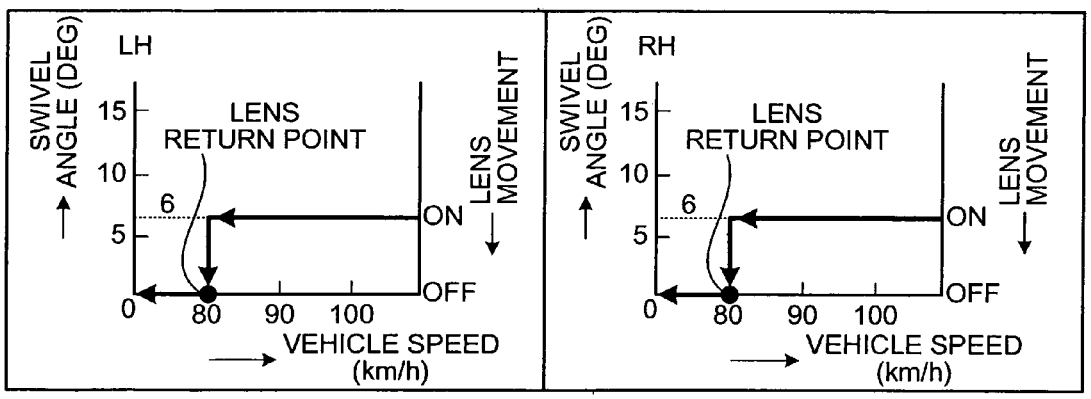
FIG. 45 includes explanatory graphs showing a control correlation (control algorithm) among the vehicle speed, lens movement, and swivel angle, for switching the variable spot lamp unit from the first motorway light distribution pattern to the low-beam light distribution pattern.

Hereunder, the intensity (illuminance) control of the spot light distribution pattern SP01 for first high-speed night driving will be described, referring to the control algorithm shown in FIGS. 44 and 45. FIGS. 44 and 45 include explanatory graphs showing a control correlation (control algorithm) among the vehicle speed (horizontal axis: km/h), lens movement (right vertical axis: ON/OFF) and swivel angle (left vertical axis: degrees), for the variable spot lamp units L1R, L2R, and L3R on the right side RH and the variable spot lamp units L1L, L2L, and L3L on the left side LH.

Figure 49:
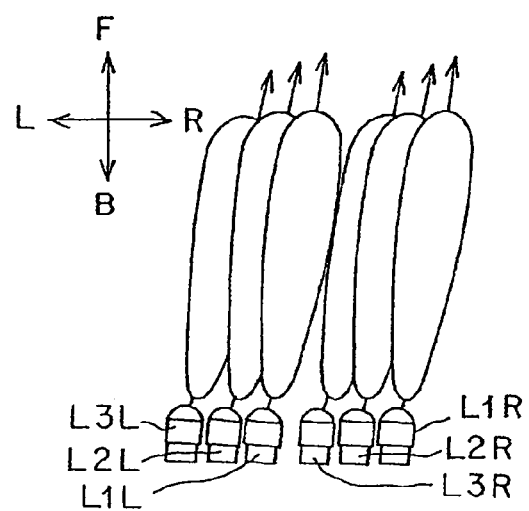
FIG. 49 is an explanatory drawing showing the variable spot lamp units emitting the first motorway light distribution pattern.

As is apparent from FIG. 44, when the speed reaches or exceeds 90 km/h during high-speed driving at night, the sliding units 20R1, 20R2, 20R3, 20L1, 20L2, and 20L3 are simultaneously activated, or sliding units 20R4 and 20L4 are activated so as to switch on the lens movement thus to move the lens 2 from the first position to the second position. Also, as shown in FIG. 49, the swivel units 23R1, 23R2, 23R3, 23L1, 23L2, and 23L3, or 23R4 and 23L4 are activated, so that the variable spot lamp units L1R, L2R, L3R, L1L, L2L, and L3L are equally swiveled to the right by approximately 6 degrees.

At this moment, the diffused type spot light distribution pattern SP0 is most effectively condensed to form the condensed type spot light distribution pattern SP01, and the condensed type spot light distribution pattern SP01 is swiveled to the right by approximately 6 degrees, as shown in FIG. 42. As a result, the upper side of the most effectively condensed spot light distribution pattern SP01 forms a new middle horizontal cutoff line CL4 located approximately 0.23 degrees below the left and right horizontal line HL-HR on the screen, at a position approximately 6 degrees to the right from the up and down vertical line VU-VD.

Figure 48:
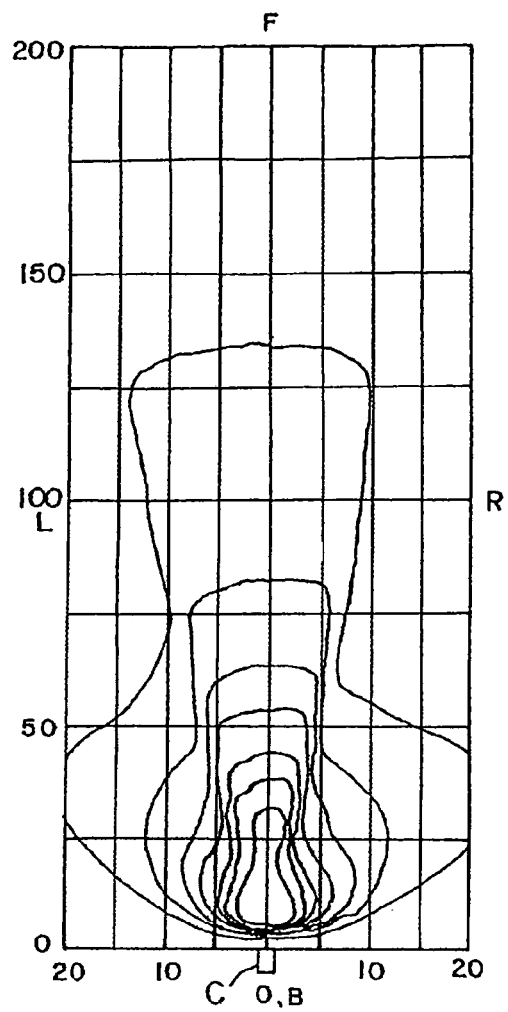
FIG. 48 is an explanatory graph showing the first motorway light distribution pattern on the road.
Figure 52:
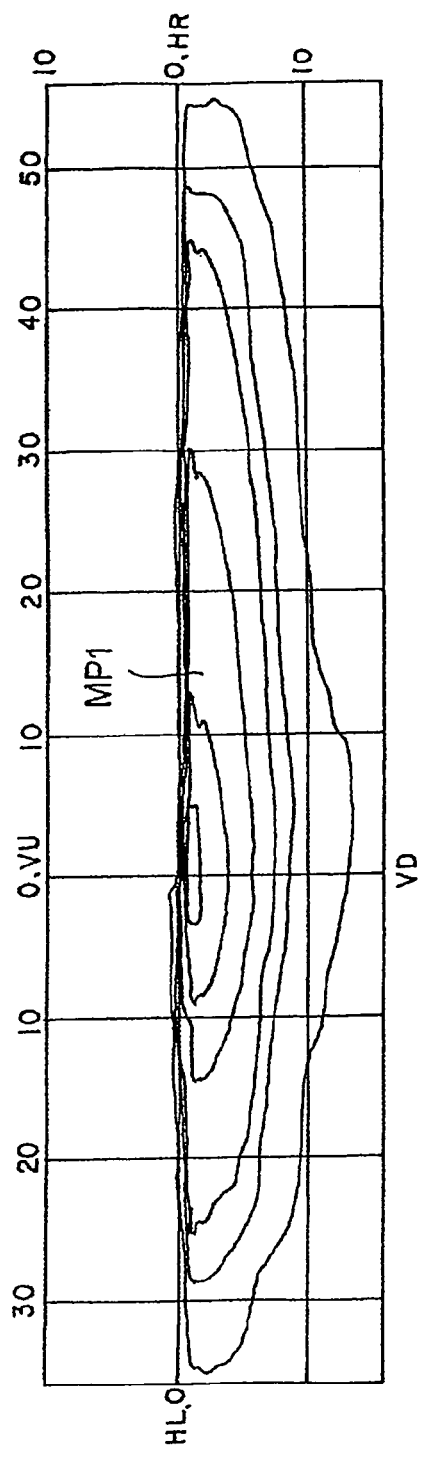
FIG. 52 is an explanatory graph of the first motorway light distribution pattern shown on a screen.

The foregoing process provides the first motorway light distribution pattern MP1 as shown in FIGS. 48 and 52. The first motorway light distribution pattern MP1 includes the new middle horizontal line CL4 created out of a part of the lower horizontal cutoff line CL3 and shifted upward by approximately 0.34 degrees at maximum with respect to the ordinary low-beam light distribution pattern LP, namely from approximately 0.57 degrees to approximately 0.23 degrees below the left and right horizontal line HL-HR on the screen, and has a maximum intensity increased by 80 percent. Also, the middle cutoff line CL4 extends at least to approximately 4.5 degrees to the right from the up and down vertical line VU-VD on the screen. With these advantages, the first motorway light distribution pattern MP1 is very effective for high-speed driving at night.

Further, as is apparent from FIG. 45, when the speed is reduced to 80 km/h or lower during high-speed driving at night, the swivel units 23R1, 23R2, 23R3, 23L1, 23L2, and 23L3, or 23R4 and 23L4 are activated so as to direct all the variable spot lamp units L1R, L2R, L3R, L1L, L2L, and L3L, which have been swiveled, to 0 degrees (front direction). Also, the sliding units 20R1, 20R2, 20R3, 20L1, 20L2, and 20L3 are activated to turn off the lens movement, thus to cause the lens 2 to return to the first position from the second position. At this moment, the condensed type spot light distribution pattern SP01 shown in FIG. 42 returns to the diffused type spot light distribution pattern SP0 as shown in FIG. 41, and accordingly the first motorway light distribution pattern MP1 shown in FIGS. 48 and 52 returns to the ordinary low-beam light distribution pattern LP.

As described above, the vehicle headlamp system according to this embodiment provides the first motorway light distribution pattern MP1 which is very effective for high-speed driving at night, by the movement of the lens 2 and the swiveling operation of the variable spot lamp units L1R, L2R, and L3R, L1L, L2L, and L3L. Therefore, the motorway light distribution pattern MP1 can have a simplified structure in comparison with a headlamp system that provides an additional light flux or includes an additional device to create a different cutoff line, yet securely provides effective performance in a high-speed drive at night.

Also, since the position of the intersection of the upper horizontal cutoff line CL1 and the oblique cutoff line CL2 at the left of the up and down vertical line VU-VD on the screen remains unchanged on the left and right horizontal line HL-HR on the screen, a glare via the mirror, which is incidental to passing by a preceding vehicle, can be prevented from being cast to the driver of the preceding vehicle.

Further, the swiveling motion of the most effectively condensed spot light distribution pattern SP01 to the right by approximately 6 degrees accurately follows up the driver's habit of watching a far-off point along the center line of the vehicle C when driving at a high speed, and moreover, satisfies the desirable condition that the road surface illuminance distribution be mirror-symmetric with respect to the center of the vehicle C, like a high-beam light distribution pattern (not shown).

Figure 46:
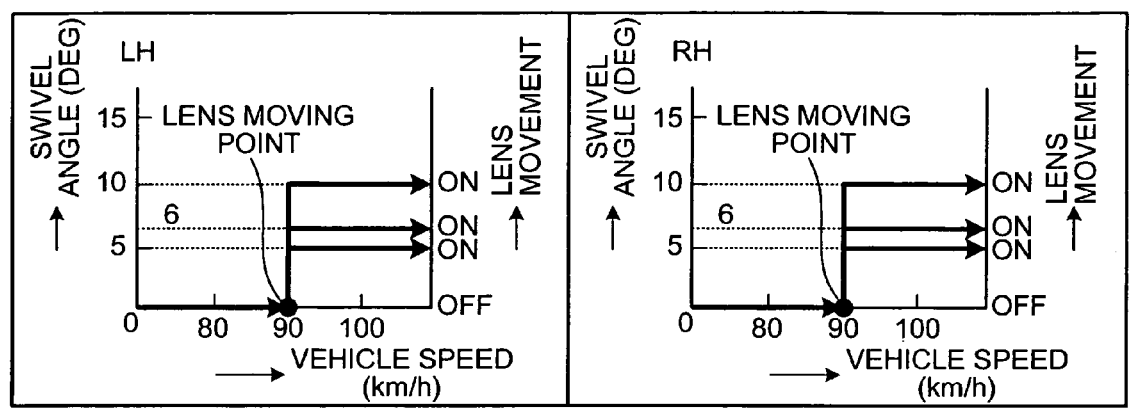
FIG. 46 includes explanatory graphs showing a control correlation (control algorithm) among the vehicle speed, lens movement, and swivel angle, for switching the variable spot lamp unit from the low-beam light distribution pattern to the second motorway light distribution pattern.
Figure 47:
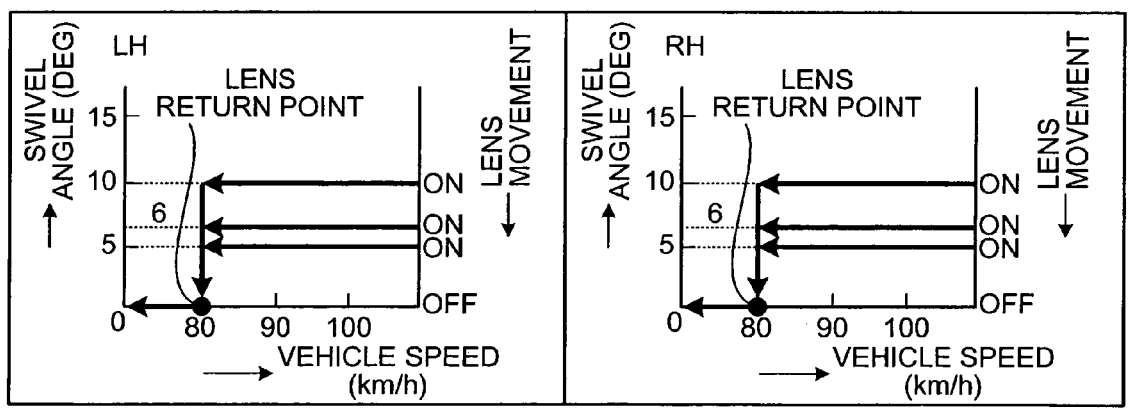
FIG. 47 includes explanatory graphs showing a control correlation (control algorithm) among the vehicle speed, lens movement, and swivel angle, for switching the variable spot lamp unit from the second motorway light distribution pattern to the low-beam light distribution pattern.

Hereunder, the intensity control of the spot light distribution pattern SP02 for a second high-speed night driving will be described, referring to the control algorithm shown in FIGS. 46 and 47. FIGS. 46 and 47 include, as FIGS. 44 and 45 above, explanatory graphs showing a control correlation (control algorithm) among the vehicle speed (horizontal axis: km/h), lens movement (right vertical axis: ON/OFF), and swivel angle (left vertical axis: degrees), for the variable spot lamp units L1R, L2R, and L3R on the right side RH and the variable spot lamp units L1L, L2L, and L3L on the left side LH.

Figure 51:
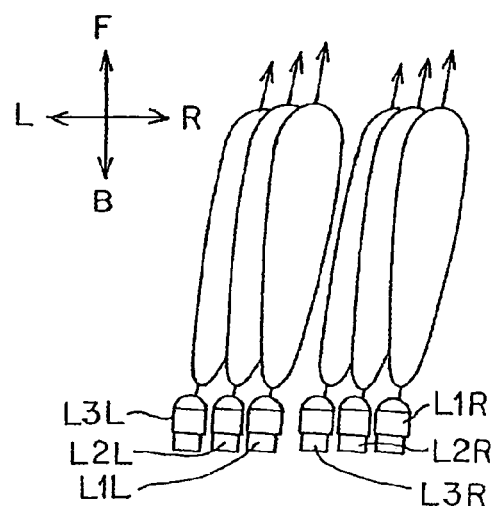
FIG. 51 is an explanatory drawing showing the variable spot lamp units emitting the second motorway light distribution pattern.

As is apparent from FIG. 46, when the speed reaches or exceeds 90 km/h during high-speed driving at night, the sliding units 20R1, 20R2, 20R3, 20L1, 20L2, and 20L3 are activated, so as to switch on the lens movement thus to move the lens 2 from the first position to the second position. Also, as shown in FIG. 51, the swivel units 23R1, 23R2, 23R3, 23L1, 23L2, and 23L3 are activated, so as to swivel the first variable spot lamp units L1R and L1L approximately 5 degrees to the right, the second variable spot lamp units L2R and L2L approximately 6 degrees to the right, and the third variable spot lamp units L3R and L3L approximately 10 degrees to the right, independently.

At this moment, as shown in FIG. 43, the diffused type spot light distribution pattern SP0 is most effectively condensed to form the condensed type spot light distribution pattern SP02, and the condensed type spot light distribution pattern SP02 is swiveled to the right. More specifically, the first spot light distribution pattern. SP12 is swiveled approximately 5 degrees to the right, the second spot light distribution pattern SP22 approximately 6 degrees to the right, and the third spot light distribution pattern SP32 approximately 10 degrees to the right, independently. As a result, the upper side of the most effectively condensed spot light distribution pattern SP02 forms a new middle horizontal cutoff line CL4 located approximately 0.23 degrees below the left and right horizontal line HL-HR on the screen, at a position at least approximately 4.5 degrees to the right from the up and down vertical line VU-VD.

Figure 50:
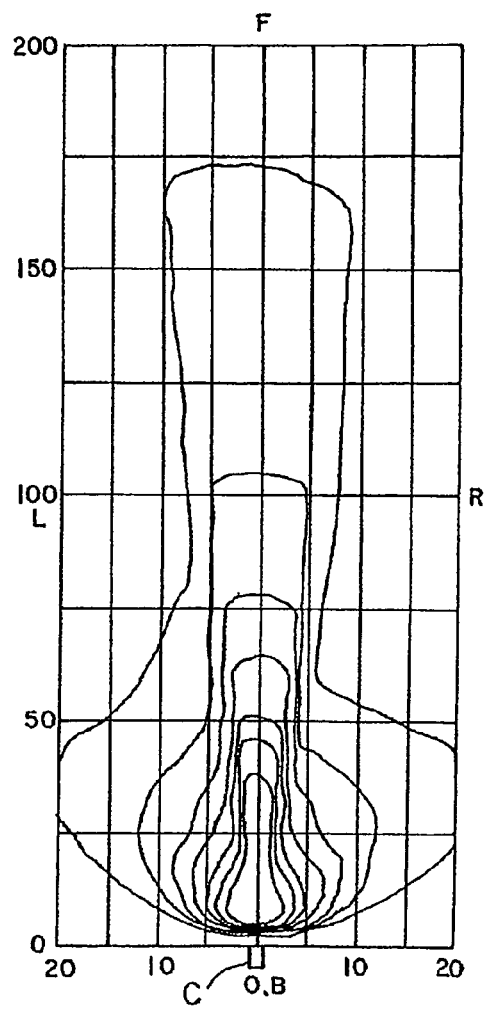
FIG. 50 is an explanatory graph showing the second motorway light distribution pattern on the road.
Figure 53:
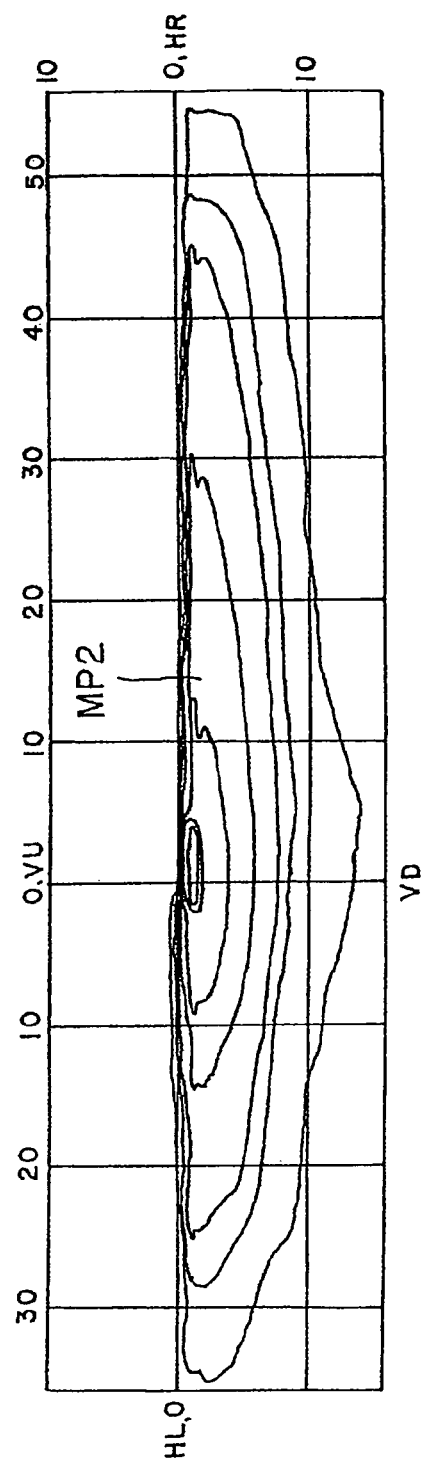
FIG. 53 is an explanatory graph of the second motorway light distribution pattern shown on a screen.

The foregoing process provides the second motorway light distribution pattern MP2 as shown in FIGS. 50 and 53. The motorway light distribution pattern MP2 is, equally to the first motorway light distribution pattern MP1, very effective for high-speed driving at night.

Further, as is apparent from FIG. 47, when the speed is reduced to 80 km/h or lower during high-speed driving at night, the swivel units 23R1, 23R2, 23R3, 23L1, 23L2, and 23L3, are activated so as to direct all the variable spot lamp units L1R, L2R, L3R, L1L, L2L, and L3L, which have been swiveled, to 0 degrees (front direction). Also, the sliding units 20R1, 20R2, 20R3, 20L1, 20L2, and 20L3 are activated to turn off the lens movement, thus to cause the lens 2 to return to the first position from the second position. At this moment, the condensed type spot light distribution pattern SP02 shown in FIG. 43 returns to the diffused type spot light distribution pattern SP0 as shown in FIG. 41, and accordingly the second motorway light distribution pattern MP2 shown in FIGS. 50 and 53 returns to the ordinary low-beam light distribution pattern LP.

Thus, the second motorway light distribution pattern MP2 provides the similar advantageous effects to those of the first motorway light distribution pattern MP1. Moreover, since the second motorway light distribution pattern MP2 includes the first spot light distribution pattern SP12 swiveled approximately 5 degrees to the right, and the second spot light distribution pattern SP22 and the third spot light distribution pattern SP32 further swiveled, namely approximately 6 degrees and approximately 10 degrees to the right, a further condensing effect can be achieved in comparison with the first motorway light distribution pattern MP1. Also, the right end portion of the second motorway light distribution pattern MP2 is located at least approximately 4.5 degrees to the right from the up and down vertical line VU-VD on the screen, the second motorway light distribution pattern MP2 effectively satisfies the desirable conditions for high-speed driving at night.

The control of the spot light distribution pattern for high-speed driving on a winding road at night will now be described hereunder. In the high-speed driving on a winding road at night, it is preferable to swivel, to the left and right, the first motorway light distribution pattern MP1 and the second motorway light distribution pattern MP2. Accordingly, through the operation by the control unit 38, the fourth swivel units 23R4 and 23L4 are activated, with the first, the second, and the third swivel units 23R1, 23R2, 23R3, 23L1, 23L2, and 23L3, or the fourth swivel units 23R4, 23L4 activated so as to swivel the variable spot lamp units L1R, L2R, L3R, L1L, L2L, and L3L, to thereby further swivel the variable spot lamp units L1R, L2R, L3R, L1L, L2L, and L3L simultaneously, which have already been swiveled, to the left and right. Such operation causes the first motorway light distribution pattern MP1 and the second motorway light distribution pattern MP2 to further swivel to the left and right. As a result, a light distribution pattern effective for high-speed driving on a winding road at night can be obtained. Here, since the variable spot lamp units L1R, L2R, L3R, L1L, L2L, and L3L have been swiveled in advance approximately 6 degrees to the right in the first motorway light distribution pattern MP1, the swiveling range to the right is reduced by approximately 6 degrees. However, based on an ordinary swiveling range of approximately 15 degrees, room of approximately 9 degrees is still available for further swiveling, which is sufficient in consideration of a minimum radius of curvature of approximately 250 meters on a high-speed motorway.

Figure 54:
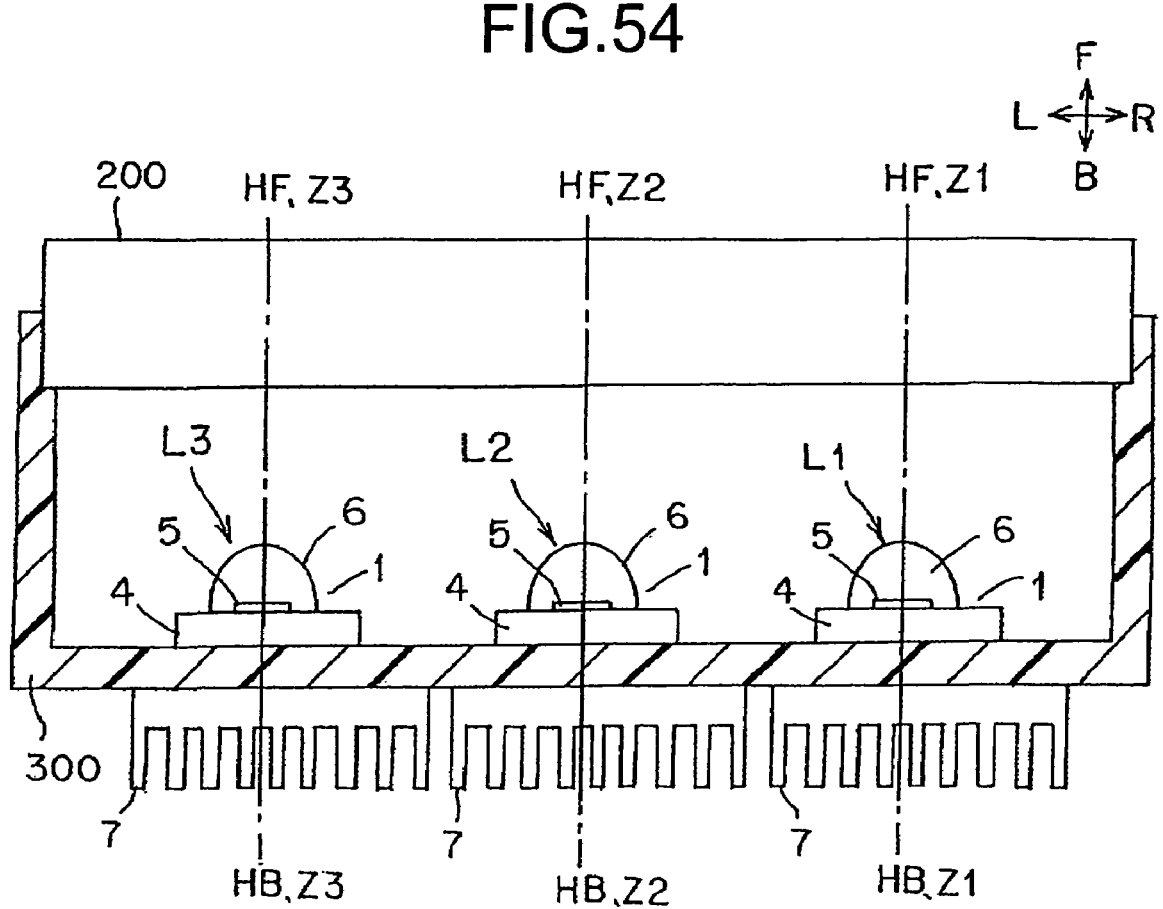
FIG. 54 is a cross-sectional view showing a modified example of a vehicle headlamp system (vehicle lighting apparatus) according to the present invention.

FIG. 54 is a cross-sectional view showing a modified example of the vehicle headlamp system. In this modification, the three spot lamp units L1, L2, and L3 (or three variable spot lamp units L1R, L2R, and L3R or L1L, L2L, and L3L) are retained by a holder 300 of a unified structure, so as to maintain a relative position with respect to a lens 200 of a unified structure.

Also, in the foregoing embodiment, the focal point F0 of the lens 2 is located ahead of the light emitting element 5, and the lens 2 is slid backward when condensing the light flux. Alternatively, according to the present invention, the focal point F0 of the lens 2 may be located behind the light emitting element 5, so that the lens 2 is slid forward when condensing the light flux.

Also, in the foregoing embodiment the fixed headlamp unit L0 includes a plurality of lamp units, each with an LED as the light source. According to the present invention, however, the fixed headlamp unit may be constituted of a single or a plurality of lamp units including a discharge light, a halogen bulb, an incandescent bulb, or the like as the light source.

Further, the foregoing embodiment includes the three spot lamp units L1, L2, and L3 (or three variable spot lamp units L1R, L2R, and L3R or L1L, L2L, and L3L). According to the present invention, however, the number of spot lamp units (or variable spot lamp units) is not specifically determined. For example, a single, two, or four or more spot lamp units (or variable spot lamp units) may be provided.

Still further, the foregoing embodiment represents a direct-emission optical system, in which the three spot lamp units L1, L2, and L3 (or three variable spot lamp units L1R, L2R, and L3R or L1L, L2L, and L3L) directly distribute the light from the light emitting element 5 of the semiconductor light source 1 through the lens 2. According to the present invention, however, a reflection type or a projection type optical system may be employed, in which the light from a square light emitting element of a semiconductor light source is reflected, and the reflected light is outwardly emitted through a lens in the form of a spot light distribution pattern. In other words, a different system may be employed provided that the light from a square light emitting element is emitted to a region below the upper horizontal cutoff line of the low-beam light distribution pattern, in the form of a generally square spot light distribution pattern.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle lighting apparatus that emits a spot light distribution pattern to be combined with a low-beam light distribution pattern emitted from a headlamp, the vehicle lighting apparatus comprising:
    a semiconductor light source formed with a rectangular light emitting element; and
    a lens that projects light emitted directly from the semiconductor light source under an upper horizontal cutoff line of the low-beam light distribution pattern, as the spot light distribution pattern of a substantially rectangular shape, wherein the spot light distribution pattern is significantly smaller than the low-beam light distribution pattern and is emitted within the low-beam light distribution pattern.

2. The vehicle lighting apparatus according to claim 1, further comprising:
    a swivel mechanism that swivels the semiconductor light source and the lens around a substantially vertical axis, to move the spot light distribution pattern in a lateral direction.

3. The vehicle lighting apparatus according to claim 1, further comprising:
    a dimming unit that changes an intensity of the spotlight distribution pattern by changing an output light flux from the light emitting element.

4. The vehicle lighting apparatus according to claim 1, further comprising:
    a condensing unit that scales the spot light distribution pattern by changing a relative position between the semiconductor light source and the lens.

5. A vehicle headlamp apparatus that independently emits a low-beam light distribution pattern and a spot light distribution pattern, the vehicle headlamp apparatus comprising:
    a headlamp that emits the low-beam light distribution pattern; and
    at least one lighting apparatus that emits the spot light distribution pattern, wherein the lighting apparatus includes
    a semiconductor light source formed with a rectangular light emitting element; and
    a lens that projects light emitted directly from the semiconductor light source under an upper horizontal cutoff line of the low-beam light distribution pattern, as the spotlight distribution pattern of a substantially rectangular shape, and
    the low-beam light distribution pattern and the spotlight distribution pattern are combined, wherein the spot light distribution pattern is significantly smaller than the low-beam light distribution pattern and is emitted within the low-beam light distribution pattern.

6. The vehicle headlamp apparatus according to claim 5, wherein
    the lighting apparatus further includes a swivel mechanism that swivels the semiconductor light source and the lens around a substantially vertical axis, to move the spot light distribution pattern in a lateral direction.

7. The vehicle headlamp apparatus according to claim 5, wherein
    the lighting apparatus further includes a dimming unit that changes an intensity of the spot light distribution pattern by changing an output light flux from the light emitting element.

8. The vehicle headlamp apparatus according to claim 5, wherein
    the lighting apparatus further includes a condensing unit that scales the spot light distribution pattern by changing a relative position between the semiconductor light source and the lens.

9. A vehicle lighting apparatus that emits spot light distribution patterns to be combined with a low-beam light distribution pattern emitted from a headlamp, the vehicle lighting apparatus comprising:
    a plurality of semiconductor light source, each formed with a rectangular light emitting element; and
    a plurality of lenses that respectively project light from the semiconductor Light sources under an upper horizontal cutoff line of the low-beam light distribution pattern, as the spot light distribution pattern of a substantially rectangular shape, wherein a side of one of the spotlight distribution patterns corresponds to an oblique cutoff line of the low-beam light distribution pattern, wherein the spot light distribution pattern is significantly smaller than the low-beam light distribution pattern and is emitted within the low-beam light distribution pattern.

10. A vehicle headlamp apparatus that independently emits a low-beam light distribution pattern and spotlight distribution patterns, the vehicle headlamp apparatus comprising: a headlamp that emits the low-beam light distribution pattern; and at least one lighting apparatus that emits the spotlight distribution pattern, wherein the lighting apparatus includes a plurality of semiconductor light sources, each formed with a rectangular Light emitting element; and a plurality of lens that respectively projects light from the semiconductor light sources under an upper horizontal cutoff line of the low-beam light distribution pattern, as the spot light distribution pattern of a substantially rectangular shape, wherein a side of one of the spotlight distribution patterns corresponds to an oblique cutoff line of the low-beam light distribution pattern, and the low-beam light distribution pattern and the spotlight distribution pattern are combined, wherein the spot light distribution patterns are significantly smaller than the low-beam light distribution pattern and are emitted within the low-beam light distribution pattern.

* * * * *